United States Patent
Wang et al.

(10) Patent No.: US 12,439,064 B2
(45) Date of Patent: Oct. 7, 2025

(54) ROLL SAMPLE GROUP IN VVC VIDEO CODING

(71) Applicants: Beijing Bytedance Network Technology Co., Ltd., Beijing (CN); Bytedance Inc., Los Angeles, CA (US)

(72) Inventors: Ye-Kui Wang, San Diego, CA (US); Li Zhang, San Diego, CA (US); Haibin Yin, Beijing (CN); Lingyu Li, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 29 days.

(21) Appl. No.: 18/307,161

(22) Filed: Apr. 26, 2023

(65) Prior Publication Data
US 2023/0269384 A1    Aug. 24, 2023

Related U.S. Application Data

(63) Continuation of application No. PCT/CN2021/126299, filed on Oct. 26, 2021.

(30) Foreign Application Priority Data

Oct. 26, 2020 (WO) ................ PCT/CN2020/123540

(51) Int. Cl.
H04N 19/30 (2014.01)
H04N 19/107 (2014.01)
(Continued)

(52) U.S. Cl.
CPC .......... *H04N 19/30* (2014.11); *H04N 19/107* (2014.11); *H04N 19/172* (2014.11); *H04N 19/188* (2014.11); *H04N 19/70* (2014.11)

(58) Field of Classification Search
CPC .... H04N 19/30; H04N 19/107; H04N 19/172; H04N 19/188; H04N 19/70
See application file for complete search history.

(56) References Cited

U.S. PATENT DOCUMENTS

2005/0220441 A1   10/2005   Comer
2016/0212437 A1   7/2016    Tsukuba
(Continued)

FOREIGN PATENT DOCUMENTS

CN   101416149 A   4/2009
CN   105103561 A   11/2015
(Continued)

OTHER PUBLICATIONS

"Information technology—High efficiency coding and media delivery in heterogeneous environments—Part 2: High Efficiency Video Coding", ISO/IEC JTC 1/SC 29/WG 11 N17661, Rec. ITU-T H.265 | ISO/IEC 23008-2 (in force edition), Apr. 20, 2018, 8 pages.

(Continued)

*Primary Examiner* — Jae N Noh
(74) *Attorney, Agent, or Firm* — Conley Rose, P.C.

(57) ABSTRACT

A mechanism for processing video data is disclosed. A conversion is performed between a visual media data and a visual media data file. The visual media data file includes pictures in layers, a random access recovery point (roll) sample group specifying access points into the layers, and a grouping type parameter. The grouping type parameter specifies a correspondence between the access points and relevant layers of the layers. The grouping type parameter includes a layer identifier method identification code parameter specifying that the access points include one or more of: one or more gradual decoding refresh (GDR) pictures; and one or more mixed network abstraction layer (NAL) unit (Continued)

pictures with both an intra random access point (IRAP) subpicture and a non-IRAP subpicture.

17 Claims, 7 Drawing Sheets

(51) Int. Cl.
  *H04N 19/169* (2014.01)
  *H04N 19/172* (2014.01)
  *H04N 19/70* (2014.01)

(56) References Cited

U.S. PATENT DOCUMENTS

| | | | |
|---|---|---|---|
| 2017/0111642 | A1 | 4/2017 | Hendry |
| 2020/0177923 | A1 | 6/2020 | Chen |
| 2020/0302650 | A1 | 9/2020 | Aksu |
| 2022/0070496 | A1 | 3/2022 | Wang et al. |
| 2022/0086430 | A1 | 3/2022 | Wang |
| 2022/0086494 | A1 | 3/2022 | Wang |
| 2023/0015840 | A1* | 1/2023 | Sánchez La Fuente ............... H04N 21/8451 |
| 2023/0336761 | A1 | 10/2023 | Hendry |
| 2024/0040169 | A1* | 2/2024 | Hendry .............. H04N 21/2343 |

FOREIGN PATENT DOCUMENTS

| | | | |
|---|---|---|---|
| CN | 105556981 A | 5/2016 | |
| CN | 107211159 A | 9/2017 | |
| CN | 107750458 A | 3/2018 | |
| CN | 108141616 A | 6/2018 | |
| CN | 108353191 A | 7/2018 | |
| CN | 109155861 A | 1/2019 | |
| GB | 202007552 | 7/2020 | |
| IN | 201747023656 A | 7/2017 | |
| IN | 201827009114 A | 9/2018 | |
| JP | 2008518516 A | 5/2008 | |
| JP | 2016507988 A | 3/2016 | |
| JP | 2018510546 A | 4/2018 | |
| JP | 2018511208 A | 4/2018 | |
| JP | 2018524891 A | 8/2018 | |
| JP | 2022050360 A | 3/2022 | |
| JP | 2023508736 A | 3/2023 | |
| WO | 2015105399 A1 | 7/2015 | |
| WO | WO-2017066075 A1 * | 4/2017 | ............. H04N 19/30 |
| WO | 2019141901 A1 | 7/2019 | |

OTHER PUBLICATIONS

Document: JVET-G1001-v1, Chen, J., et al., "Algorithm Description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
"Information technology—Coded representation of immersive media—Part 3: Versatile video coding, ISO/IEC JTC 1/SC 29/WG 11 N18692," Rec. Itu-T H.266 | ISO/IEC 23090-3, Jul. 12, 2019, 445 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
"Series H: Audiovisual and Multimedia Systems Infrastructure of audiovisual services—Coding of moving video Versatile supplemental enhancement information messages for coded video bitstreams" Rec. ITU-T Rec. H.274 | ISO/IEC 23002-7, Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.

ISO/IEC 14496-12: "Information technology—Coding of audio-visual objects—Part 12: ISO base media file format, Technical Corrigendum 1," ISO/IEC JTC 1/SC 29 N, Jun. 3, 2016, 303 pages.
ISO/IEC 23009-1: "Information technology—Dynamic adaptive streaming over HTTP (DASH)—Part 1: Media presentation description and segment formats," ISO/IEC JTC1/SC29/WG11 MPEG2019/m52458, Jan. 2020, 287 pages.
ISO/IEC 14496-15: "Information technology—Coding of audio-visual objects—Part 15: Carriage of network abstraction layer (NAL) unit structured video in the ISO base media file format," ISO/IEC 14496-15: 2021, 282 pages.
ISO/IEC 23008-12: "Information technology—High efficiency coding and media delivery in heterogeneous environments—Part 12: Image File Format—Amendment 2: Support for VVC, EVC, slideshows and other improvements," ISO/IEC 23008-12:2017/DAM 2: 2021 (E), 39 pages.
MPEG output document N19454, "Information technology—Coding of audio-visual objects—Part 15: Carriage of network abstraction layer (NAL) unit structured video in the ISO base media file format—Amendment 2: Carriage of VVC and EVC in ISOBMFF," ISO/IEC 14496-15:2019(E) Amendment 2, 2020, 55 pages.
MPEG output document N19460, "Information technology—High efficiency coding and media delivery in heterogeneous environments—Part 12: Image File Format—Amendment 3: Support for VVC, EVC, slideshows and other improvements", ISO/IEC 23008-12:2017(E) Amendment 3, Jul. 2020, 24 pages.
Wang, Y., "Signalling of decoder configuration information and subpicture entity groups," ISO/IEC JTC 1/SC 29/WG 3 m55177, Oct. 2020, 9 pages.
Hendry, "On signalling operating point related information in sample entry of VVC file format," ISO/IEC JTC 1/SC 29/WG 3 m55015, Oct. 2020, 6 pages.
Sanchez, Y., "[14496-15]: On Random Access for mixed NALUs in VVC with shifted IRAPs," ISO/IEC JTC 1/SC 29/WG 3 m55163, Oct. 2020, 4 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Foreign Communication From A Related Counterpart Application, PCT Application No. PCT/CN2021/126297, International Search Report dated Dec. 30, 2021, 10 pages.
Foreign Communication From A Related Counterpart Application, PCT Application No. PCT/CN2021/126299, International Search Report dated Jan. 17, 2022, 12 pages.
"Technologies under Consideration for NAL File Format", ISO/IEC JTC 1/SC 29/WG 03 N0036, Oct. 16, 2020, XP030291529, Retrieved from the Internet: URL: https://dms.mpeg.expert/doc_end_user/documents/132_OnLine/wg11/MDS19716_WG03_N00036.zip N0036. docx[retrieved on Oct. 21, 2020], 33 pages.
Extended European Search Report from U.S. Patent Application No. 21885124.4 dated Feb. 13, 2024, 10 pages.
Non-Final Office Action for U.S. Appl. No. 18/306,886, mailed Oct. 7, 2024, 18 Pages.
Japanese Notification of Reasons for Refusal from Japanese Patent Application No. 2023-524965 dated Nov. 26, 2024, 6 pages.
Japanese Office Action from Japanese Patent Application No. 2023-524966 dated Jul. 30, 2024, 6 pages.
Japanese Office Action from Japanese Patent Application No. 2023-524965 dated Jul. 30, 2024, 6 pages.
Document: JVET-M0101, Skupin, R., et al., "AHG17: On VVC HLS," Joint Video Experts Team (JVET) of ITU-T SG 16 WP 3 and ISO/IEC JTC 1/SC 29/WG 11 13th Meeting: Marrakech, MA, Jan. 9-18, 2019, 11 pages.
Indian Office Action from Indian Patent Application No. 202327030432 dated Oct. 1, 2025, 6 pages.
Japanese Decision of Registration for Japanese Patent Application No. 2023-524965 dated Mar. 11, 2025, 5 pages.
Chinese Office Action from Chinese Patent Application No. 202180073375.9 dated Jul. 8, 2025, 22 pages.

(56) References Cited

OTHER PUBLICATIONS

Chinese Notice of Allowance from Chinese Patent Application No. 202180073375.9 dated Aug. 20, 2025, 5 pages.

* cited by examiner

ROLL SAMPLE GROUP IN VVC VIDEO CODING

CROSS-REFERENCE TO RELATED APPLICATIONS

This application is a continuation of International Patent Application No. PCT/CN2021/126299, filed on Oct. 26, 2021, which claims the priority to and benefits of International Patent Application No. PCT/CN2020/123540, filed on Oct. 26, 2020. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: performing a conversion between a visual media data and a visual media data file that includes pictures in layers, a random access recovery point (roll) sample group specifying access points into the layers, and a grouping type parameter, the grouping type parameter specifying a correspondence between the access points and relevant layers of the layers and including a layer identifier method identification code parameter specifying that the access points include one or more of: one or more gradual decoding refresh (GDR) pictures; and one or more mixed network abstraction layer (NAL) unit pictures with both an intra random access point (IRAP) subpicture and a non-IRAP subpicture.

Optionally, in any of the preceding aspects, another implementation of the aspect provides that the conversion includes: encoding the pictures into the layers in the visual media file; determining the roll sample group specifying access points into the layers; encoding the grouping type parameter into the media file; and storing the visual media file.

Optionally, in any of the preceding aspects, another implementation of the aspect provides that the conversion includes: receiving the visual media file comprising the pictures coded into the layers; obtaining the roll sample group from the media file, the roll sample group specifying the access points into the layers; obtaining the grouping type parameter from the media file; and decoding the media file based on the grouping type parameter.

Optionally, in any of the preceding aspects, another implementation of the aspect provides that the grouping type parameter includes a target layers parameter including a plurality of bits with each bit specifying one of the relevant layers.

Optionally, in any of the preceding aspects, another implementation of the aspect provides that the layer identifier method identification code parameter specifies the access points apply to only the relevant layers.

Optionally, in any of the preceding aspects, another implementation of the aspect provides that the layer identifier method identification code parameter specifies the access points apply to all of the layers.

Optionally, in any of the preceding aspects, another implementation of the aspect provides that the grouping type parameter is denoted as group_type_parameter, and that the target layer parameter is denoted as target_layers, and wherein the layer identifier method identification code parameter is denoted as layer_id_method_idc.

Optionally, in any of the preceding aspects, another implementation of the aspect provides that the layer_id_method_idc is set to zero when specifying all access points in the relevant layers are GDR pictures and the access points apply to all the layers.

Optionally, in any of the preceding aspects, another implementation of the aspect provides that the layer_id_method_idc is set to one when specifying all access points in the relevant layers are GDR pictures and the access points apply to only the relevant layers.

Optionally, in any of the preceding aspects, another implementation of the aspect provides that the layer_id_method_idc is set to two when specifying the access points in the relevant layers are GDR pictures, mixed NAL unit pictures, or combinations thereof and the access points apply to all the layers.

Optionally, in any of the preceding aspects, another implementation of the aspect provides that the layer_id_method_idc is set to three when specifying the access points in the relevant layers are GDR pictures, mixed NAL unit pictures, or combinations thereof and the access points apply to only the relevant layers.

A second aspect relates to an apparatus for processing video data comprising a processor and a non-transitory memory with instructions thereon, wherein the instructions upon execution by the processor, cause the processor to: perform a conversion between a visual media data and a visual media data file that includes pictures in layers, a random access recovery point (roll) sample group specifying access points into the layers, and a grouping type parameter, the grouping type parameter specifying a correspondence between the access points and relevant layers of the layers and including a layer identifier method identification code parameter specifying that the access points include one or more of: one or more gradual decoding refresh (GDR) pictures; and one or more mixed network abstraction layer (NAL) unit pictures with both an intra random access point (IRAP) subpicture and a non-IRAP subpicture.

Optionally, in any of the preceding aspects, another implementation of the aspect provides that the conversion includes: encoding the pictures into the layers in the visual media file; determining the roll sample group specifying access points into the layers; encoding the grouping type parameter into the media file; and storing the visual media file.

Optionally, in any of the preceding aspects, another implementation of the aspect provides that the conversion includes: receiving the visual media file comprising the pictures coded into the layers; obtaining the roll sample group from the media file, the roll sample group specifying the access points into the layers; obtaining the grouping type parameter from the media file; and decoding the media file based on the grouping type parameter.

Optionally, in any of the preceding aspects, another implementation of the aspect provides that the grouping type parameter includes a target layers parameter including a plurality of bits with each bit specifying one of the relevant layers.

Optionally, in any of the preceding aspects, another implementation of the aspect provides that the layer identifier method identification code parameter specifies the access points apply to only the relevant layers.

Optionally, in any of the preceding aspects, another implementation of the aspect provides that the layer identifier method identification code parameter specifies the access points apply to all of the layers.

Optionally, in any of the preceding aspects, another implementation of the aspect provides that the grouping type parameter is denoted as group_type_parameter, and that the target layer parameter is denoted as target_layers, and wherein the layer identifier method identification code parameter is denoted as layer_id_method_idc.

Optionally, in any of the preceding aspects, another implementation of the aspect provides that the layer_id_method_idc is set to zero when specifying all access points in the relevant layers are GDR pictures and the access points apply to all the layers.

Optionally, in any of the preceding aspects, another implementation of the aspect provides that the layer_id_method_idc is set to one when specifying all access points in the relevant layers are GDR pictures and the access points apply to only the relevant layers.

Optionally, in any of the preceding aspects, another implementation of the aspect provides that the layer_id_method_idc is set to two when specifying the access points in the relevant layers are GDR pictures, mixed NAL unit pictures, or combinations thereof and the access points apply to all the layers.

Optionally, in any of the preceding aspects, another implementation of the aspect provides that the layer_id_method_idc is set to three when specifying the access points in the relevant layers are GDR pictures, mixed NAL unit pictures, or combinations thereof and the access points apply to only the relevant layers.

A third aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
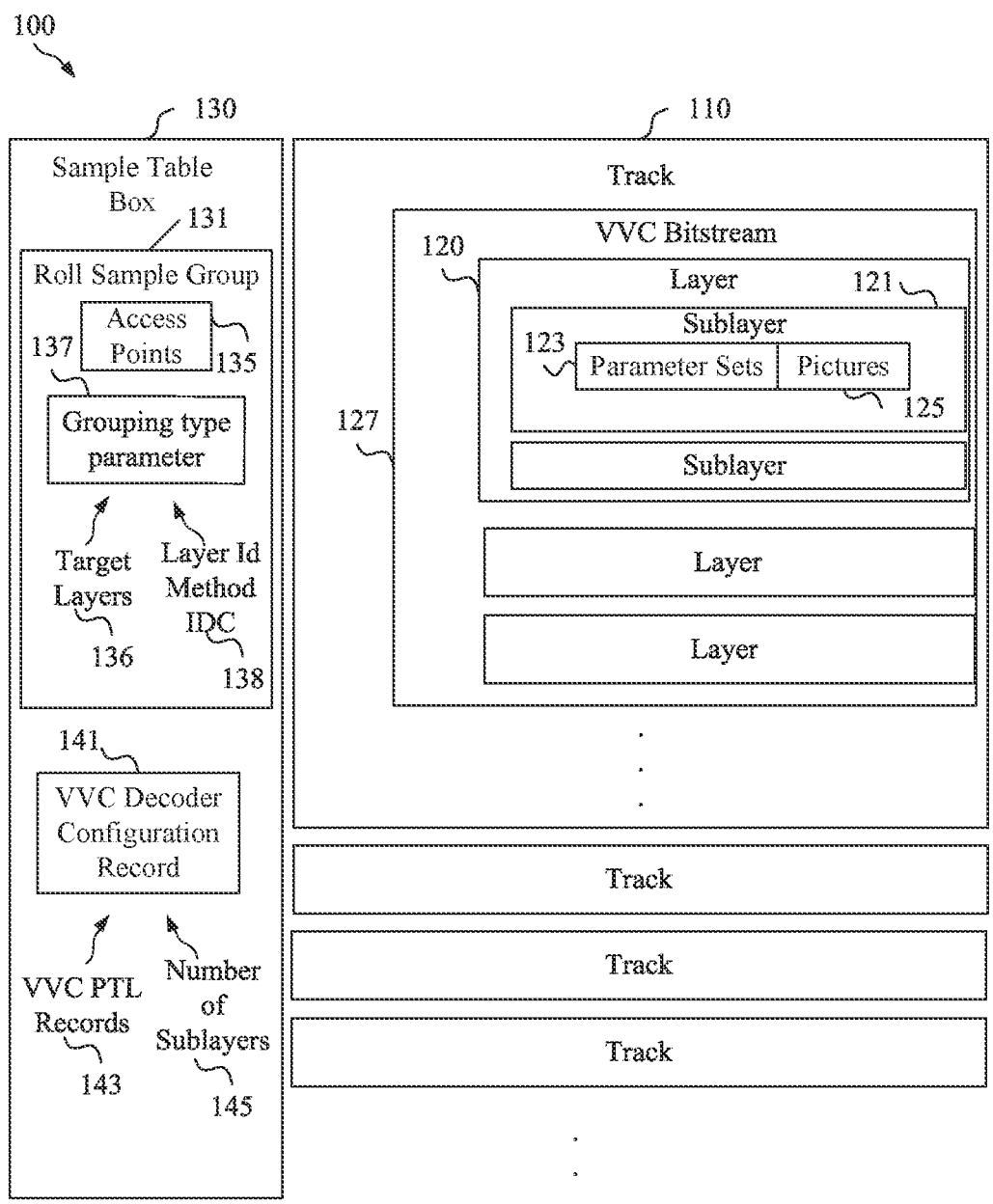
FIG. 1 is a schematic diagram of an example media file containing a Versatile Video Coding (VVC) bitstream of video data.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile video coding (VVC), also known as H.266, terminology is used in some description only for ease of understanding and not for limiting scope of the disclosed techniques. As such, the techniques described herein are applicable to other video codec protocols and designs also. In the present disclosure, editing changes are shown to text by strikethrough indicating cancelled text and italics indicating added text, with respect to the current draft of the VVC specification or International Organization for Standardization (ISO) base media file format (ISOBMFF) file format specification.

An example implementation of the abovementioned aspects is described as follows.

This disclosure is related to video file formats. Specifically, this disclosure is related to signaling of decoder configuration information and the 'roll' sample group in media files carrying VVC video bitstreams based on the ISO base media file format (ISOBMFF). The ideas may be applied individually or in various combination, for video bitstreams coded by any codec, e.g., the VVC standard, and for any video file format, e.g., the VVC video file format being developed.

Adaptive color transform (ACT), adaptive loop filter (ALF), adaptive motion vector resolution (AMVR), adaptation parameter set (APS), access unit (AU), access unit delimiter (AUD), advanced video coding (Rec. International Telecommunication Union—Telecommunication Standardization Sector (ITU-T) H.264| International Organization for Standardization (ISO)/International Electrotechnical Commission (IEC) 14496-10) (AVC), bi-predictive (B), bi-prediction with CU-level weights (BCW), bi-directional optical flow (BDOF), block-based delta pulse code modulation (BDPCM), buffering period (BP), context-based adaptive binary arithmetic coding (CABAC), coding block (CB), constant bit rate (CBR), cross-component adaptive loop filter (CCALF), Coded layer video stream (CLVS), coded picture buffer (CPB), clean random access (CRA), cyclic redundancy check (CRC), coding tree block (CTB), coding tree unit (CTU), coding unit (CU), coded video sequence (CVS), decoded picture buffer (DPB), decoding capability information (DCI), dependent random access point (DRAP), decoding unit (DU), decoding unit information (DUI), exponential-Golomb (EG), k-th order exponential-Golomb (EGk), end of bitstream (EOB), end of sequence (EOS), filler data (FD), first-in, first-out (FIFO), fixed-length (FL), green, blue, and red (GBR), general constraints information (GCI), gradual decoding refresh (GDR), geometric partitioning mode (GPM), high efficiency video coding, also known as Rec. ITU-T H.265| ISO/IEC 23008-2, (HEVC), hypothetical reference decoder (HRD), hypothetical stream scheduler (HSS), intra (I), intra block copy (IBC), instantaneous decoding refresh (IDR), inter-layer reference picture (ILRP), intra random access point (IRAP), low frequency non-separable transform (LFNST), least probable symbol (LPS), least significant bit (LSB), long-term reference picture (LTRP), luma mapping with chroma scaling (LMCS), matrix-based intra prediction (MIP), most probable symbol (MPS), most significant bit (MSB), multiple transform selection (MTS), motion vector prediction (MVP), network abstraction layer (NAL), output layer set (OLS), operation point (OP), operating point information (OPI), predictive (P), picture header (PH), picture order count (POC), picture parameter set (PPS), prediction refinement with optical flow (PROF), picture timing (PT), picture unit (PU), quantization parameter (QP), random access decodable leading picture (RADL), random access skipped leading picture (RASL), raw byte sequence payload (RBSP), red, green, and blue (RGB), reference picture list (RPL), sample adaptive offset (SAO), sample aspect ratio (SAR), supplemental enhancement information (SEI), slice header (SH), subpicture level information (SLI), string of data bits (SODB), sequence parameter set (SPS), short-term reference picture (STRP), step-wise temporal sublayer access (STSA), truncated rice (TR), variable bit rate (VBR), video coding layer (VCL), video parameter set (VPS), versatile supplemental enhancement information, also known as Rec. ITU-T H.274| ISO/IEC 23002-7, (VSEI), video usability information (VUI), versatile video coding, also known as Rec. ITU-T H.266| ISO/IEC 23090-3, (VVC), and wavefront parallel processing (WPP).

Video coding standards have evolved primarily through the development of the ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

The Versatile Video Coding (VVC) standard (ITU-T H.266| ISO/IEC 23090-3) and the associated Versatile Supplemental Enhancement Information (VSEI) standard (ITU-T H.274|ISO/IEC 23002-7) have been designed for use in a broad range of applications, including both uses such as television broadcast, video conferencing, or playback from storage media, and also more advanced use cases such as adaptive bit rate streaming, video region extraction, composition, and merging of content from multiple coded video bitstreams, multiview video, scalable layered coding, and viewport-adaptive 360° immersive media.

Media streaming applications are generally based on the Internet Protocol (IP), Transmission Control Protocol (TCP), and Hypertext Transfer Protocol (HTTP) transport methods, and generally rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format, would be used for encapsulation of the video content in ISOBMFF tracks and in DASH representations and segments. Information about the video bitstreams, e.g., the profile, tier, and level, and many others, would be exposed as file format level metadata and/or a DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format, would be employed. The VVC video file format, the file format for storage of VVC video content based on ISOBMFF, is under development by MPEG. The VVC image file format, the file format for storage of image content coded using VVC, based on ISOBMFF, is under development by MPEG.

Below are the designs of some VVC file format features based on the VVC image file format and MPEG. This subclause specifies the decoder configuration information for ISO/IEC 23090-3 video content. This record contains the size of the length field used in each sample to indicate the length of its contained NAL units as well as the parameter sets, DCI, OPI, and SEI NAL units, if stored in the sample entry. This record is externally framed (its size is supplied by the structure that contains it). This record contains a version field. This version of the specification defines version 1 of this record. Incompatible changes to the record are indicated by a change of version number. Readers should not attempt to decode this record or the streams to which it applies if the version number is unrecognized. Compatible extensions to this record extend it and do not change the configuration version code. Readers should be prepared to ignore unrecognized data beyond the definition of the data they understand.

VVC Profile Tier Level Record (VvcPTLRecord) should be present in the decoder configuration record when the track contains a VVC bitstream natively or though resolving 'subp' track references, and in this case the specific output layer set for the VVC bitstream is indicated by the field output_layer_set_idx. If the ptl_present_flag is equal to zero in the decoder configuration record of a track then the track shall have an 'oref' track reference to an identifier (ID), which may refer to either a VVC track or an 'opeg' entity group. The values for the syntax elements of VvcPTLRecord, chroma format identification code (chroma_format_idc), and bit depth in minus eight format (bit_depth_minus8) shall be valid for all parameter sets that are referenced when the stream described by this record is decoded (referred to as "all the parameter sets" in the following sentences in this paragraph). Specifically, the following restrictions may apply:

The profile indication general profile identification code (general_profile_idc) shall indicate a profile to which the output layer set identified by output layer set index (output_layer_set_idx) in this configuration record conforms. If different profiles are marked for different CVSs of the output layer set identified by output_layer_set_idx in this configuration record, then the stream could need examination to determine which profile, if any, the entire stream conforms to. If the entire stream is not examined, or the examination reveals that there is no profile to which the entire stream conforms, then the entire stream is expected to be split into two or more sub-streams with separate configuration records in which these rules can be met. The tier indication general_tier_flag shall indicate a tier equal to or greater than the highest tier indicated in all the profile_tier_level( ) syntax structures (in all the parameter sets) to which the output layer set identified by output_layer_set_idx in this configuration record conforms.

Each bit in general_constraint_info may only be set if the bit is set in all the general_constraints_info( ) syntax structures in all the profile_tier_level( ) syntax structures (in all the parameter sets) to which the output layer set identified by output_layer_set_idx in this configuration record conforms. The level indication general_level_idc shall indicate a level of capability equal to or greater than the highest level in all the profile_tier_level( ) syntax structures (in all the parameter sets) to which the output layer set identified by output_layer_set_idx in this configuration record conforms.

The following constraints apply for chroma format identification code (chroma_format_idc). If the VVC stream to which the configuration record applies is a single-layer bitstream, the value of sps_chroma_format_idc, as defined in ISO/IEC 23090-3, shall be the same in all SPSs referenced by the VCL NAL units in the samples to which the current sample entry description applies, and the value of chroma_format_idc shall be equal to that value of sps_chroma_format_idc. Otherwise (the VVC stream to which the configuration record applies is a multi-layer bitstream), the value of vps_ols_dpb_chroma_format [MultiLayerOlsIdx [output_layer_set_idx]], shall be the same for all the CVSs to which the current sample entry description applies, and the value of chroma_format_idc shall be equal to that value of vps_ols_dpb_chroma_format[MultiLayerOlsIdx [output_layer_set_idx]].

The following constraints apply for bit_depth_minus8. If the VVC stream to which the configuration record applies is a single-layer bitstream, the value of sps_bitdepth_minus8 shall be the same in all SPSs referenced by the VCL NAL units in the samples to which the current sample entry description applies, and the value of bit_depth_minus8 shall be equal to that value of sps_bitdepth_minus8. Otherwise (the VVC stream to which the configuration record applies is a multi-layer bitstream), the value of vps_ols_dpb_bitdepth_minus8 [MultiLayerOlsIdx[output_layer_set_idx]], shall be the same for all the CVSs to which the current sample entry description applies, and the value of bit_depth_minus8 shall be equal to that value of vps_ols_dpb_bitdepth_minus8[MultiLayerOlsIdx [output_layer_set_idx]].

The following constraints apply for picture_width. If the VVC stream to which the configuration record applies is a single-layer bitstream, the value of sps_pic_width_max_in_luma_samples, as defined in ISO/IEC 23090-3, shall be the same in all SPSs referenced by the VCL NAL units in the samples to which the current sample entry description applies, and the value of picture_width shall be equal to that value of sps_pic_width_max_in_luma_samples. Otherwise (the VVC stream to which the configuration record applies is a multi-layer bitstream), the value of vps_ols_dpb_pic_width[MultiLayerOlsIdx [output_layer_set_idx]], shall be the same for all the CVSs to which the current sample entry description applies, and the value of picture_width shall be equal to that value of vps_ols_dpb_pic_width[MultiLayerOlsIdx[output_layer_set_idx]].

The following constraints apply for picture_height. If the VVC stream to which the configuration record applies is a single-layer bitstream, the value of sps_pic_height_max_in_luma_samples shall be the same in all SPSs referenced by the VCL NAL units in the samples to which the current sample entry description applies, and the value of picture_height shall be equal to that value of sps_pic_height_max_in_luma_samples. Otherwise (the VVC stream to which the configuration record applies is a multi-layer bitstream), the value of vps_ols_dpb_pic_height[MultiLayerOlsIdx[output_layer_set_idx]] shall be the same for all the CVSs to which the current sample entry description applies, and the value of picture_height shall be equal to that value of vps_ols_dpb_pic_height[MultiLayerOlsIdx[output_layer_set_idx]].

Explicit indication is provided in the VVC Decoder Configuration Record about the chroma format and bit depth as well as other format information used by the VVC video elementary stream. If two sequences differ in color space or bit depth indications in their VUI information, then two different VVC sample entries are also employed.

There is a set of arrays to carry initialization non-VCL NAL units. The NAL unit types are restricted to indicate DCI, OPI, VPS, SPS, PPS, prefix APS, and prefix SEI NAL units only. NAL unit types that are reserved may acquire a further definition, and readers should ignore arrays with reserved or unpermitted values of NAL unit type. This tolerant behavior is designed so that errors are not raised, allowing the possibility of backwards-compatible extensions to these arrays in further specifications. The NAL units carried in a sample entry are included immediately following the AUD and OPI NAL units (if any) in, or otherwise at the beginning of, the access unit reconstructed from the first sample that references the sample entry.

It is recommended that the arrays be in the order DCI, OPI, VPS, SPS, PPS, prefix APS, prefix SEI.

Example syntax of the VVCPTLRecord and the VvcDecoderConfigurationRecord is as follows:

```
aligned(8) class VvcPTLRecord(num_sublayers) {
    bit(2) reserved = 0;
    unsigned int(6) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(8*num_bytes_constraint_info - 2)
        general_constraint_info;
    for (i=num_sublayers - 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers-2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc[j];
}
aligned(8) class VvcDecoderConfigurationRecord {
```

-continued

```
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
      VvcPTLRecord(numTemporalLayers) track_ptl;
      unsigned int(16) output_layer_set_idx;
      unsigned int(16) avgFrameRate;
      unsigned int(2) constantFrameRate;
      unsigned int(3) numTemporalLayers;
      unsigned int(2) chroma_format_idc;
      unsigned int(3) bit_depth_minus8;
      bit(6) reserved = '111111'b;
      unsigned_int(16) picture_width;
      unsigned_int(16) picture_height;
    }
    unsigned int(8) numOfArrays;
    for (j=0; j < numOfArrays; j++) {
      unsigned int(1) array_completeness;
      bit(2) reserved = 0;
      unsigned int(5) NAL_unit_type;
      unsigned int(16) numNalus;
      for (i=0; i< numNalus; i++) {
        unsigned int(16) nalUnitLength;
        bit(8*nalUnitLength) nalUnit;
      }
    }
}
```

An example of semantics for the syntax elements above is as follows.

num_bytes_constraint_info is used to specify the length of the general_constraint_info field. The length of the general_constraint_info field is num_bytes_constraint_info*8-2 bits. The value shall be greater than 0. The value equal to 1 indicates that the gci_present_flag in the general_constraint_info( ) syntax structure represented by the general_constraint_info field is equal to 0.

general_profile_idc, general_tier_flag, general_level_idc, ptl_frame_only_constraint_flag, ptl_multilayer_enabled_flag, general_constraint_info, sublayer_level_present[j], sublayer_level_idc[i], num_sub_profiles, and general_sub_profile_idc[j] contain the matching values for the fields or syntax structures general_profile_idc, general_tier_flag, general_level_idc, ptl_frame_only_constraint_flag, ptl_multilayer_enabled_flag, general_constraint_info( ), ptl_sublayer_level_present[i], sublayer_level_idc[i], ptl_num_sub_profiles, and general_sub_profile_idc[j] for the stream to which this configuration record applies.

lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.

ptl_present_flag equal to 1 specifies that the track contains a VVC bitstream corresponding to the operating point specified by output_layer_set_idx and numTemporalLayers and all NAL units in the track belong to that operating point. ptl_present_flag equal to 0 specifies that the track may not contain a VVC bitstream corresponding to a specific operating point, but rather may contain a VVC bitstream corresponding to multiple output layer sets or may contain one or more individual layers that do not form an output layer set or individual sublayers excluding the sublayer with TemporalId equal to 0.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means or by an OPI NAL unit to the VVC decoder for decoding the bitstream contained in the track.

avgFrameRate gives the average frame rate in units of frames/(256 seconds), for the stream to which this configuration record applies. Value 0 indicates an unspecified average frame rate. When the track contains multiple layers and samples are reconstructed for the operating point specified by output_layer_set_idx and numTemporalLayers, this gives the average access unit rate of the bitstream of the operating point.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate. When the track contains multiple layers and samples are reconstructed for the operating point specified by output_layer_set_idx and numTemporalLayers, this gives the indication of whether the bitstream of the operating point has constant access unit rate.

numTemporalLayers greater than 1 indicates that the track to which this configuration record applies is temporally scalable and the contained number of temporal layers (also referred to as temporal sublayer or sublayer) is equal to numTemporalLayers. Value 1 indicates that the track to which this configuration record applies is not temporally scalable. Value 0 indicates that it is unknown whether the track to which this configuration record applies is temporally scalable.

chroma_format_idc indicates the chroma format that applies to this track.

picture_width indicates the maximum picture width, in units of luma samples, that applies to this track.

picture_height indicates the maximum picture height, in units of luma samples, that applies to this track.

bit_depth_minus8 indicates the bit depth that applies to this track.

numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the permitted values are constrained by the sample entry name.

NAL_unit_type indicates the type of the NAL units in the following array (which shall be all of that type); it is restricted to take one of the values indicating a DCI, OPI, VPS, SPS, PPS, prefix APS or prefix SEI NAL unit.

numNalus indicates the number of NAL units of the indicated type included in the configuration record for the stream to which this configuration record applies. The SEI array shall only contain SEI messages of a declarative nature, that is, those that provide information about the stream as a whole. An example of such an SEI could be a user-data SEI.

nalUnitLength indicates the length in bytes of the NAL unit.

nalUnit contains a DCI, OPI, VPS, SPS, PPS, APS or declarative SEI NAL unit.

The random access recovery point sample group, which is also known as the 'roll' sample group, is used to provide information on recovery points for gradual decoding refresh. When a 'roll' sample group is used with VVC tracks, the syntax and semantics of grouping_type_parameter are specified identically to those for the 'sap' sample group.

layer_id_method_idc equal to 0 and 1 are used when the pictures of the target layers of a sample that is mapped to the 'roll' sample group are GDR pictures. When layer_id_method_idc is equal to 0, the 'roll' sample group specifies the behavior for all layers present in the track.

The semantics of layer_id_method_idc equal to 1 are specified herein.

layer_id_method_idc equal to 2 and 3 are used when not all pictures of the target layers of a sample that is mapped to the 'roll' sample group are GDR pictures, and for pictures of the target layers that are not GDR pictures, the following applies: the referenced PPS has pps_mixed_nalu_types_in_pic_flag equal to 1, and for each subpicture index i in the range of 0 to sps_num_subpics_minus1, inclusive, both of the following are true: sps_subpic_treated_as_pic_flag[i] is equal to 1 and there is at least one IRAP subpicture having the same subpicture index i in or following the current sample in the same CLVS. When layer_id_method_idc is equal to 2, the 'roll' sample group specifies the behavior for all layers present in the track. The semantics of layer_id_method_idc equal to 3 are specified herein. When a reader uses a sample marked with layer_id_methoc_idc equal to 2 or 3 for starting the decoding, the reader needs to further modify the SPS, PPS, and PH NAL units of the bitstream, so that a bitstream starting with a sample marked as belonging to this sample group with layer_id_method_idc equal to 2 and 3 is a conforming bitstream when any SPS referred to by such a sample has sps_gdr_enabled_flag equal to 1, any PPS referred to by such a sample has pps_mixed_nalu_types_in_pic_flag equal to 0, all VCL NAL units of the AU have nal_unit_type equal to GDR_NUT and any picture header of the AU has ph_gdr_pic_flag equal to 1 and a value of ph_recovery_poc_cnt corresponding to the roll_distance of this sample group that the AU belongs to. When a 'roll' sample group concerns a dependent layer but not its reference layer(s), the sample group indicates characteristics that apply when all the reference layers of the dependent layer are available and decoded. The sample group can be used to initiate decoding of the predicted layer.

When layer_id_method_idc is equal to 1, each bit in the field target_layers represents a layer carried in the track. Since this field is only 28 bits in length, the indication of SAPs in a track is constrained to a maximum of 28 layers. Each bit of this field starting from the least significant bit (LSB) shall be mapped to the list of layer_id values signaled in the Layer Information sample group ('linf') associated with that sample, in ascending order of layer_id values.

The following are example technical problems solved by disclosed technical solutions. The latest designs of the VVC video file format regarding the signaling of decoder configuration information and the 'roll' sample group have the following problems. First, in the VvcDecoderConfigurationRecord, the picture format parameters, including color format, bit depth, picture width, and picture height are signaled when the profile, tier, and level information (PTL) is signaled. These pieces of information can be used for content selection purposes. However, there are also other parameters that can be useful for content selection purposes, such as the required decoded picture buffer size, maximum picture output reordering, max latency, GDR pictures enabled flag, CRA pictures enabled flag, reference picture resampling enabled flag, spatial resolution change with CLVS enabled flag, subpicture partitioning enabled flag, maximum number of subpictures in each picture, WPP enabled flag, tile partitioning enabled flag, maximum number of tiles per picture, slice partitioning enabled flag, rectangular slices enabled flag, raster-scan slices enabled flag, maximum number of slices per picture, etc., but may not be signaled in the decoder configuration record.

Second, in the VvcDecoderConfigurationRecord, when the PTL information is signaled, the numTemporalLayers field is also signaled, after the signaling of the PTL information. However, the syntax structure for signaling of the PTL information depends on the numTemporalLayers field.

Third, in the description of the random access recovery point sample group, i.e., the 'roll' sample group, the semantics of the fields layer_id_method_idc equal to 1 or 3 are not properly specified. In particular, the signaling of the applicable layers may be specified when layer_id_method_idc is equal to 1, among other things, but may not be specified when layer_id_method_idc is equal to 3.

Disclosed herein are mechanisms to address one or more of the problems listed above. In an example, the VVC decoder configuration record is modified to position the number of sublayers prior to the PTL records. In this way, the decoder can first obtain the number of sublayers and use that number to obtain the PTL records for each of the sublayers. In another example, the grouping type parameter of the roll sample group is modified to more clearly describe the correlation between access points in the roll sample group and the layers to which those access points apply. For example, a target layer can indicate the layers that correlate to the access points. Further, a layer identifier method identification code can be set to indicate whether the access points apply to all layers or just the layers in the target layer parameter. Further, the layer identifier method identification code can be set to indicate whether the access points consist of GDR pictures only or comprises a combination of GDR pictures and mixed NAL unit pictures.

To solve the above problems, and others, methods as summarized below are disclosed. The items should be considered as examples to explain the general concepts and should not be interpreted in a narrow way. Furthermore, these items can be applied individually or combined in any manner.

Example 1

To solve the first problem, one or more of the following parameters may be signaled in the VvcDecoderConfigurationRecord: the maximum required size of the decoded picture buffer, the maximum picture output reordering (e.g., the maximum allowed number of pictures that can precede any picture in in decoding order and follow that picture in output order), the maximum latency (e.g., the maximum number of pictures that can precede any picture in output order and follow that picture in decoding order), GDR pictures enabled flag, CRA pictures enabled flag, reference picture resampling enabled flag, spatial resolution change with CLVS enabled flag, subpicture partitioning enabled flag, maximum number of subpictures in each picture, WPP enabled flag, tile partitioning enabled flag, maximum number of tiles per picture, slice partitioning enabled flag, rectangular slices enabled flag, and raster-scan slices enabled flag, and maximum number of slices per picture.

(a) In one example, one or more of the above parameters are only signaled in the VvcDecoderConfigurationRecord when the PTL information is signaled therein.

(b) In one example, the one or more parameters may be present before the signaling of the PTL information.

Furthermore, byte-alignment can be required for all parameters that are signaled before the PTL information. In one example, reserved bits may be further signaled.
  (c) In one example, the one or more parameters may be present after the signaling of the PTL information. Furthermore, byte-alignment may be required for all parameters that are signaled after the PTL information. In one example, reserved bits may be further signaled.
  (d) In one example, a subset of the one or more parameters may be present before and the remaining may be present after the signaling of the PTL information. Furthermore, byte-alignment may be required for all parameters that are signaled before the PTL information. In one example, reserved bits may be further signaled.
  (e) Furthermore, byte-alignment may be required for all parameters that are signaled after the PTL information. In one example, reserved bits may be further signaled.

Example 2

To solve the second problem, the VvcDecoderConfigurationRecord is modified such that, when the PTL information is signaled, the numTemporalLayers field is also signaled before the signaling of the PTL information.
  (a) In one example, when the PTL information is signaled in the VvcDecoderConfigurationRecord, it is signaled after the fields chroma_format_idc, bit_depth_minus8, numTemporalLayers, and constantFrameRate. In one example, the PTL information is signaled directly after all the above-mentioned fields and some reserved bits.
  (b) In one example, when the PTL information is signaled in the VvcDecoderConfigurationRecord, it is signaled after the fields numTemporalLayers, and constantFrameRate. In one example, the PTL information is signaled directly after all the above-mentioned fields and some reserved bits. Furthermore, additional reserved bits are further signaled after the PTL information.
  (c) In another example, when the PTL information is signaled in the VvcDecoderConfigurationRecord, it is signaled as the last field among all fields that are conditioned on "if (ptl_present_flag)".
  (d) In one example, reserved bits are signaled, before the signaling of the PTL information.

Example 3

To solve the third problem 3, one or more of the following changes are made: The following sentence:
  (a) "The semantics of layer_id_method_idc equal to 1 are specified in clause 9.5.7." is changed to be as follows: "When layer_id_method_idc is equal to 1, the layers for which the behavior is specified by the 'roll' sample group are specified in clause 9.5.7." As used herein, clause 9.5.7 refers to a corresponding numbered clause in document ISO/IEC 14496-15:2021 (E) entitled Information technology—Coding of audio-visual objects—Part 15: Carriage of network abstraction layer (NAL) unit structured video in the ISO base media file format.
  (b) "The semantics of layer_id_method_idc equal to 3 are specified in clause 9.5.7." is changed to be as follows: "When layer_id_method_idc is equal to 3, the layers for which the behavior is specified by the 'roll' sample group are specified in the same manner as when layer_id_method_idc is equal to 1 as specified in clause 9.5.7."

Example 4

To solve problem 3, alternatively, one or more of the following changes are made:
  (a) The following sentence in clause 9.5.7: "When layer_id_method_idc is equal to 1, each bit in the field target_layers represents a layer carried in the track." is changed to be as follows: "When layer_id_method_idc is equal to 1 or 3, each bit in the field target_layers represents a layer carried in the track."
  (b) The following sentence: "The semantics of layer_id_method_idc equal to 1 are specified in clause 9.5.7." is changed to be as follows: "When layer_id_method_idc is equal to 1, the layers for which the behavior is specified by the 'roll' sample group are specified in clause 9.5.7."
  (c) The following sentence: "The semantics of layer_id_method_idc equal to 3 are specified in clause 9.5.7." is changed to be as follows: "When layer_id_method_idc is equal to 3, the layers for which the behavior is specified by the 'roll' sample group are specified in clause 9.5.7."

Below are some example embodiments for some of the aspects summarized above, which can be applied to the standard specification for VVC video file format. The changed texts are based on the latest draft specification of the relevant features as described above. The relevant parts that have been added or modified are denoted in underline bold and the deleted parts are denoted in bold italics.

In an example, the syntax for the VvcDecoderConfigurationRecord is modified as follows:

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(2) chroma_format_idc;
        unsigned int(3) bit_depth_minus8;
        unsigned int(3) numTemporalLayers;
        unsigned int(2) constantFrameRate;
        bit(6) reserved = '111111'b;
        VvcPTLRecord(numTemporalLayers) track_ptl;
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit_depth_minus8;
        bit(6) reserved = '111111'b;
        unsigned int(16) picture_width;
        unsigned int(16) picture_height;
        unsigned int(16) avgFrameRate;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

In an example, the semantics for the VvcDecoderConfigurationRecord is modified as follows:

ptl_present_flag equal to 1 specifies that the track contains a VVC bitstream corresponding to the operating point specified by output_layer_set_idx and numTemporalLayers and all NAL units in the track belong to that operating point. ptl_present_flag equal to 0 specifies that the track may not contain a VVC bitstream corresponding to a specific operating point, but rather may contain a VVC bitstream corresponding to multiple output layer sets or may contain one or more individual layers that do not form an output layer set or individual sublayers excluding the sublayer with TemporalId equal to 0.

chroma_format_idc indicates the chroma format that applies to this track.

bit_depth_minus8 indicates the bit depth that applies to this track.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate. When the track contains multiple layers and samples are reconstructed for the operating point specified by output_layer_set_idx and numTemporalLayers, this gives the indication of whether the bitstream of the operating point has constant access unit rate.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means or by an OPI NAL unit to the VVC decoder, as specified in ISO/IEC 23090-3, for decoding the bitstream contained in the track.

avgFrameRate gives the average frame rate in units of frames/(256 seconds), for the stream to which this configuration record applies. Value 0 indicates an unspecified average frame rate. When the track contains multiple layers and samples are reconstructed for the operating point specified by output_layer_set_idx and numTemporalLayers, this gives the average access unit rate of the bitstream of the operating point.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate. When the track contains multiple layers and samples are reconstructed for the operating point specified by output_layer_set_idx and numTemporalLayers, this gives the indication of whether the bitstream of the operating point has constant access unit rate.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

chroma_format_idc indicates the chroma format that applies to this track.

picture_width indicates the maximum picture width, in units of luma samples, that applies to this track.

picture_height indicates the maximum picture height, in units of luma samples, that applies to this track.

bit_depth_minus8 indicates the bit depth that applies to this track.

avgFrameRate gives the average frame rate in units of frames/(256 seconds), for the stream to which this configuration record applies. Value 0 indicates an unspecified average frame rate. When the track contains multiple layers and samples are reconstructed for the operating point specified by output_layer_set_idx and numTemporalLayers, this gives the average access unit rate of the bitstream of the operating point.

numArrays indicates the number of arrays of NAL units of the indicated type(s).

In an example, the description of the Random access recovery point sample group is modified as follows: The random access recovery point sample group 'roll' is used to provide information on recovery points for gradual decoding refresh. When a 'roll' sample group is used with VVC tracks, the syntax and semantics of grouping_type_parameter are specified identically to those for the 'sap' sample group. layer_id_method_idc equal to 0 and 1 are used when the pictures of the target layers of a sample that is mapped to the 'roll' sample group are GDR pictures. When layer_id_method_idc is equal to 0, the 'roll' sample group specifies the behavior for all layers present in the track.

When layer_id_method_idc is equal to 1, the layers for which the behavior is specified by the 'roll' sample group. The semantics of layer_id_method_idc equal to 1 are specified in clause 9.5.7.

layer_id_method_idc equal to 2 and 3 are used when not all pictures of the target layers of a sample that is mapped to the 'roll' sample group are GDR pictures, and for pictures of the target layers that are not GDR pictures, the following applies: the referenced PPS has pps_mixed_nalu_types_in_pic_flag equal to 1, and for each subpicture index i in the range of 0 to sps_num_subpics_minus1, inclusive, both of the following are true: sps_subpic_treated_as_pic_flag[i] is equal to 1 and there is at least one IRAP subpicture having the same subpicture index i in or following the current sample in the same CLVS. When layer_id_method_idc is equal to 2, the 'roll' sample group specifies the behavior for all layers present in the track.

When layer_id_method_idc is equal to 3, the layers for which the behavior is specified by the 'roll' sample group. The semantics of layer_id_method_idc equal to 3 are specified in the same manner as when layer_id_method_idc is equal to 1 as specified in clause 9.5.7.

When a reader uses a sample marked with layer_id_methoc_idc equal to 2 or 3 for starting the decoding, the reader needs to further modify the SPS, PPS and PH NAL units of the bitstream reconstructed according to clause 11.6 (of document ISO/IEC 14496-15:2021 (E)), so that a bitstream starting with a sample marked as belonging to this sample group with layer_id_method_idc equal to 2 and 3 is a conforming bitstream when any SPS referred to by such a sample has sps_gdr_enabled_flag equal to 1, any PPS referred to by such a sample has pps_mixed_nalu_types_in_pic_flag equal to 0, all VCL NAL units of the AU have nal_unit_type equal to GDR_NUT and any picture header of the AU has ph_gdr_pic_flag equal to 1 and a value of ph_recovery_poc_cnt corresponding to the roll_distance of this sample group that the AU belongs to.

When a 'roll' sample group concerns a dependent layer but not its reference layer(s), the sample group indicates characteristics that apply when all the reference layers of the dependent layer are available and decoded. The sample group can be used to initiate decoding of the predicted layer.

In an example, the syntax for the VvcDecoderConfigurationRecord is modified as follows:

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        VvcPTLRecord(numTemporalLayers) track_ptl;
            unsigned int(16) output_layer_set_idx;
            unsigned int(16) avgFrameRate;
            unsigned int(2) constantFrameRate;
            unsigned int(3) numTemporalLayers;
            unsigned int(2) chroma_format_idc;
            unsigned int(3) bit_depth_minus8;
            bit(6) reserved = '111111'b;
            unsigned_int(16) picture_width;
            unsigned_int(16) picture_height;
            VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

In an example, the semantics for the VvcDecoderConfigurationRecord is modified as follows:

ptl_present_flag equal to 1 specifies that the track contains a VVC bitstream corresponding to the operating point specified by output_layer_set_idx and numTemporalLayers and all NAL units in the track belong to that operating point. ptl_present_flag equal to 0 specifies that the track may not contain a VVC bitstream corresponding to a specific operating point, but rather may contain a VVC bitstream corresponding to multiple output layer sets or may contain one or more individual layers that do not form an output layer set or individual sublayers excluding the sublayer with TemporalId equal to 0.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means or by an OPI NAL unit to the VVC decoder, as specified in ISO/IEC 23090-3, for decoding the bitstream contained in the track.

avgFrameRate gives the average frame rate in units of frames/(256 seconds), for the stream to which this configuration record applies. Value 0 indicates an unspecified average frame rate. When the track contains multiple layers and samples are reconstructed for the operating point specified by output_layer_set_idx and numTemporalLayers, this gives the average access unit rate of the bitstream of the operating point.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate. When the track contains multiple layers and samples are reconstructed for the operating point specified by output_layer_set_idx and numTemporalLayers, this gives the indication of whether the bitstream of the operating point has constant access unit rate.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

chroma_format_idc indicates the chroma format that applies to this track.

bit_depth_minus8 indicates the bit depth that applies to this track.

picture_width indicates the maximum picture width, in units of luma samples, that applies to this track.

picture_height indicates the maximum picture height, in units of luma samples, that applies to this track.

bit_depth_minus8 indicates the bit depth that applies to this track.

track_ptl specifies the profile, tier, and level of the output layer set represented by the VVC bitstream contained in the track.

numArrays indicates the number of arrays of NAL units of the indicated type(s).

FIG. 1 is a schematic diagram of an example media file 100 containing a VVC bitstream 127 of video data. The media file includes pictures 125 that can be displayed in order to create a video sequence. The pictures 125 are compressed in the VVC bitstream 127. The bitstream 127 also comprises various parameter sets 123 that indicate to the decoder the parameters used to compress the pictures 125. The parameter sets 123 may include video parameters sets (VPS), sequence parameter sets (SPS), picture parameter sets (PPS), and adaptions parameters sets (APS) that include parameters for the entire video, parameters for a sequence of the video, parameters for one or more pictures, and parameters for regions of one or more pictures, respectively.

The compression can include intra prediction and inter prediction. In intra prediction, a picture 125 is partitioned into blocks and each block is coded relative to other blocks in the same picture 125. In inter prediction, a picture 125 is partitioned into blocks and each block is coded relative to other blocks in other pictures 125. A picture 125 coded according to inter prediction or intra prediction can be referred to as an inter coded picture or an intra coded picture, respectively. One benefit of inter coded pictures is that such pictures 125 are substantially more compressed than intra coded pictures. However, since inter coded pictures are coded relative to other pictures 125, a video decoder cannot begin decoding a video sequence at an inter coded picture. Instead, the video decoder can start decoding a video at any intra coded picture. Intra coded pictures may also be referred to as IRAP pictures. This is because any intra coded picture can act as an access point 135 into a video stream. An access point 135 is any location in a video stream where the decoder can begin decoding the video stream, generally without experiencing decoding errors, for example due to missing information, with the exception of GDR pictures as described below.

In some instances, pictures 125 can be partitioned into subpictures. A subpicture is a rectangular region in a picture 125. The benefit of subpictures is that they can be treated separately during the decoding and display process. For example, subpictures can be displayed instead of displaying the entire picture 125, for example in a picture in picture application, in a virtual reality application, etc. Also, subpictures can be rearranged and stitched together in different configurations, for example in a video call application. In some instances, the set of access points 135 may be different for different subpictures in the same picture 125. For example, subpictures with less important video may have fewer access points 135 to increase compression. When this occurs, a picture 125 can include an intra coded subpicture and an inter coded subpicture, also referred to as an IRAP subpicture and a non-IRAP subpicture. The bitstream 127 is a set of network abstraction layer (NAL) units, which are video data elements sized to fit in communication network packets. Therefore, the parameter sets 123 and the pictures 125 are carried in NAL units in the bitstream 127. Hence, a picture 125 with both an IRAP subpicture and a non-IRAP subpicture can be referred to as a mixed NAL unit picture.

Another access point 135 scheme involves the use of GDR pictures. A GDR picture includes an intra coded section and one or more inter coded sections. GDR pictures are used in groups to create an access point 135. Specifically, the first GDR picture contains an intra coded region on the far left portion of the picture 125 with the remainder of the picture coded according to inter coding. The second GDR picture contains an intra coded region that is shifted right to a position that abuts but does not overlap the intra coded region of the first GDR picture. The remainder of the second GDR picture is inter coded. In this way, the intra coded region sweeps from left to right across multiple pictures. One constraint of GDR pictures is that inter coded regions to the left of the intra coded region can only refer back to previous GDR pictures in the current group of GDR pictures. A decoder may begin decoding at the first GDR picture of the group. In this case, the decoder is capable of decoding the intra coded region, but not the inter coded region. The decoder can then proceed to the second GDR picture, in which case both the intra coded region and the inter coded region to the left of the intra coded region can be decoded. Once the decoder reaches the last GDR picture, all regions can be decoded and the video can be displayed. GDR pictures produce errors when used as an access point 135, but such errors do not persist past the last GDR picture in the group. Accordingly, GDR pictures are generally not displayed when the group is used as an access point 135. The benefit of GDR pictures is that each GDR picture is smaller than an entire IRAP picture, which reduces data bursts associated with each access point 135. When a decoder is not using the GDR picture as an access point 135, the video prior to the group of GDR pictures is available, and hence the decoder can decode all the GDR pictures in the group without errors in the inter coded regions. It should be noted that GDR pictures are generally prohibited from use in conjunction with mixed NAL unit pictures.

The pictures 125 and parameter sets 123 can be organized into layers 120 and/or sublayers. A layer 120 is a grouping of pictures 125 and parameter sets 123 that can be decoded and output as part of an output layer set. For example, different layers 120 may be coded at different resolutions. In another example, an output layer set can include a base layer and enhancement layers. This allows the decoder to decode the base layer and obtain video at a first resolution and then decode a desired number of enhancement layers to increase the resolution based on device and network capabilities. A sublayer 121 is a type of layer 120 that allows for temporal scaling. For example, pictures 125 can be assigned to different sublayers 121 based on a temporal identifier (Id). As such, each sublayer 121 contains a subset of the pictures 125. This allows the decoder to decode and display selected sublayers 121 to achieve desired frame rates.

The layers 120 and/or sublayers 121 of the bitstream 127 can be arranged into tracks 110. A track 110 contains a sequence of timed samples of a particular type that can be decoded and displayed by a decoder. In this context, a sample is a unit of media data. For example, a track 110 can include a timed set of compressed video samples (e.g., pictures 125 over time), compressed audio samples, hint data samples, parameter samples, etc. It should be noted that the term sample may also refer to a color value for a pixel, but that is not the definition intended in this context. A track 110 can contain any number of layers 120 and/or any number of sublayers 121 containing such samples.

As can be appreciated by the preceding description, the data in a media file 100 can be arranged in many ways. Accordingly, the media file 100 also contains a sample table box 130 containing parameters describing the samples (e.g., media data) contained in the tracks 110. For example, the decoder can read the sample table box 130 to determine how to begin processing the data contained in the various tracks 110. Among many other parameters, the sample table box 130 may contain a roll sample group 131 and a VVC decoder configuration record 141.

A roll sample group 131 is also known as a random access recovery sample group. The roll sample group 131 is a data unit used for signaling access points 135 into the layers 120 of the VVC bitstream 127, and primarily for signaling access points 135 that occur at GDR pictures. It should be noted that a random access point (RAP) sample group may be employed for signaling access points that occur at other IRAP pictures, such as IDR, CRA, broken link access (BLA), etc. Accordingly, the roll sample group 131 contains a list of access points 135 that point to GDR pictures contained in the VVC bitstream 127. The access points 135 are considered to be samples of the roll sample group 131. In some example implementations, the operation of the roll sample group 131 is unclear. The present disclosure addresses such issues by providing parameters that clearly describe the relationship between the access points 135 in the roll sample group 131 and the layers 120.

The roll sample group 131 contains a grouping type parameter 137, which may also be denoted as group_type_parameter. The grouping type parameter 137 is a parameter that specifies the correlation/correspondence between the access points 135 and the layers 120. It should be noted that when the access points 135 apply to layer 120, the layer 120 can be referred to as a relevant layer. Hence, the layers 120 include a group of relevant layers that may the same as the set of all layers 120 or a subset of the layers 120. The grouping type parameter 137 further comprises a target layers parameter 136 and a layer identifier method identification code 138, which may be denoted as target_layers and layer_id_method_idc, respectively. In an example implementation, the target layers parameter 136 including a plurality of bits with each bit specifying one of the relevant layers. In an example, the target layers parameter 136 may be twenty four bits long, and hence may be able to specify up to twenty four relevant layers.

The layer identifier method identification code 138 specifies both the nature of the access points 135 and clarifies the correlation between the access points 135 and the layers. In an example, the layer identifier method identification code 138 may include a four bit value. In a specific implementation, the layer identifier method identification code 138 can be set to zero or two to indicate that the access points 135 apply to all layers 120. In this case, all layers are relevant layers and the target layers parameter 136 can be omitted from the media file 100 and/or ignored by the decoder. Further, the layer identifier method identification code 138 can be set to one or four to indicate that the access points 135 apply to only the relevant layers as specified by the target layers parameter 136. In addition, the layer identifier method identification code 138 can indicate the nature of the pictures 125 present at the access points 135. For example, the layer identifier method identification code 138 can be set to zero or one to indicate the access points 135 are all GDR pictures. Further, the layer identifier method identification code 138 can be set to two or three to indicate the access points 135 can be either GDR pictures or mixed NAL unit pictures with both an IRAP subpicture and a non-IRAP subpicture.

In a specific implementation, the layer_id_method_idc can be set to zero when specifying all access points in the relevant layers are GDR pictures and the access points apply to all the layers. Further, the layer_id_method_idc is set to one when specifying all access points in the relevant layers are GDR pictures and the access points apply to only the relevant layers. Also, the layer_id_method_idc is set to two when specifying the access points in the relevant layers are GDR pictures, mixed NAL unit pictures, or combinations thereof and the access points apply to all the layers. Finally, the layer_id_method_idc is set to three when specifying the access points in the relevant layers are GDR pictures, mixed NAL unit pictures, or combinations thereof and the access points apply to only the relevant layers. In this way, the decoder can parse the access points 135, the grouping type parameter 137, the target layers 136, and the layer identifier method identification code 138 to determine a correlation between the access points 135 in the roll sample group 131 and the layers 120. The decoder can then use the access points 135 to begin decoding the pictures 125 in the relevant layers.

Further, the sample table box 130 may include a VVC decoder configuration record 141, which may be denoted as VVCDecoderConfigurationRecord. The VVC decoder configuration record 141 contains data that can be used by the decoder to select content. For example, the VVC decoder configuration record 141 can contain data that describes the output layer sets and corresponding layers 120 in the tracks 110. The decoder can then use such data to select the tracks 110 that should be decoded and displayed. For example, the VVC decoder configuration record 141 can contain data describing the VVC profile tier level (PTL) records 143, the output layer set indexes, the frame rates, the number of sublayers 121, the bit depth, the chroma format, the picture sizing, etc.

The VVC PTL records 143 indicate the profile, tier, and level information for the layers 120 and/or sublayers 121. Profiles, tiers, and levels specify restrictions on bitstreams and hence limits on the capabilities needed to decode the bitstreams. Profiles, tiers and levels may also be used to indicate interoperability points between individual decoder implementations. A profile is a defined set of coding tools used to create a compliant or conforming bitstream. Each profile specifies a subset of algorithmic features and limits that shall be supported by all decoders conforming to that profile. A level is a set of constraints for a bitstream (e.g., max luma sample rate, max bit rate for a resolution, etc.). For example, a level may be a set of constraints that indicate the required decoder performance to play back a bitstream of the specified profile (e.g., hardware constraints). The levels are split into two tiers: main and high. The main tier is a lower tier than the high tier. The tiers are employed to deal with applications that differ in terms of maximum bit rate. The main tier was designed for most applications while the high tier was designed for very demanding applications. For any given profile, a level of a tier generally corresponds to a particular decoder processing load and memory capability. Accordingly, a decoder should select layers 120 and/or sublayers 121 for playback by determining the layers 120 and/or sublayers 121 with PTL information that matches the decoders capabilities.

In some example implementations, the VVC decoder configuration record 141 is unclear because a number of sublayers 145 is signaled in the VVC decoder configuration record 141 after the VVC PTL records 143. This is a problem because the decoder needs the number of sublayers 145 before the decoder can interpret the VVC PTL records 143. In the present disclosure, the number of sublayers 145 is signaled in the VVC decoder configuration record 141 before the VVC PTL records 143. The decoder can then parse the VVC decoder configuration record to obtain a number of the sublayers 145 and use the number of the sublayers 145 to determine the number of VVC PTL records for the sublayers 121. In an example, the VVC decoder configuration record 141 comprises a constant frame rate syntax element, a chroma format identification code syntax element, and a bit depth minus eight syntax element. The VVC PTL records 143 can be positioned in the VVC decoder configuration record 141 after the constant frame rate syntax element, the chroma format identification code syntax element, and the bit depth minus eight syntax element. Further, the number of the sublayers 145 can be positioned in the VVC decoder configuration record 141 prior to the constant frame rate syntax element, the chroma format identification code syntax element, and the bit depth minus eight syntax element.

In a specific implementation, the VVC decoder configuration record 141 can be implemented as follows in order to position the number of the sublayers 145 prior to the VVC PTL records 143 for use in determining the PTL information for the tracks 110, layers 120, and/or sublayers 121.

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(2) chroma_format_idc;
        unsigned int(3) bit_depth_minus8;
        unsigned int(3) numTemporalLayers;
        unsigned int(2) constantFrameRate;
        bit(6) reserved = '111111'b;
        VvcPTLRecord(numTemporalLayers) track_ptl;
        unsigned int(16) output_layer_set_idx;
```

```
        unsigned_int(16) picture_width;
        unsigned_int(16) picture_height;
        unsigned int(16) avgFrameRate;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

In another example, various additional information can be included in the VVC decoder configuration record 141 to support selection of tracks 110, layers 120, and/or sublayers 121 at the decoder. Such information may include a maximum required size of a decoded picture buffer, a maximum picture output reordering, a maximum latency, a GDR pictures enabled flag, a CRA pictures enabled flag, a reference picture resampling enabled flag, a spatial resolution change with CLVS enabled flag, a subpicture partitioning enabled flag, a maximum number of subpictures in each picture, a WPP enabled flag, a tile partitioning enabled flag, a maximum number of tiles per picture, a slice partitioning enabled flag, a rectangular slices enabled flag, a raster-scan slices enabled flag, a maximum number of slices per picture, or combinations thereof. In some examples, such information can be included only when the VVC decoder configuration record 141 comprises the VVC PTL records 143.

By including such information and/or by rearranging the order of data, the VVC decoder configuration record 141 is improved to allow for additional features and/or more efficient selection of tracks 110, layers 120, and/or sublayers 121 by the decoder.

Figure 2:
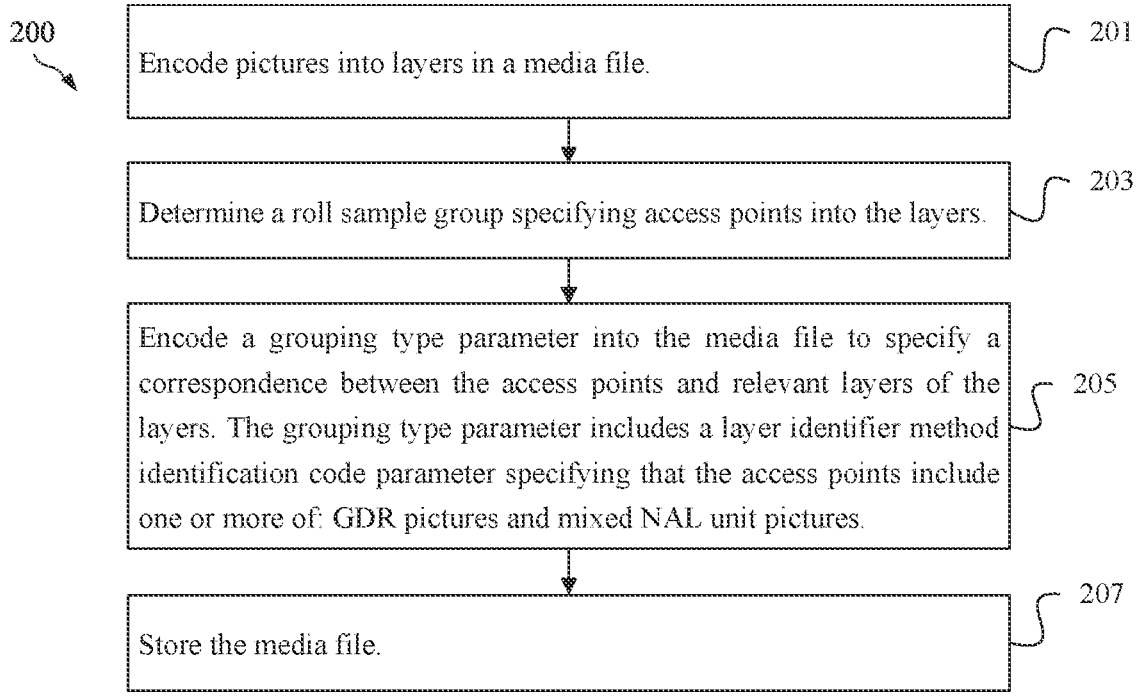
FIG. 2 is a flowchart of an example method of encoding a roll sample group.

FIG. 2 is a flowchart of an example method 200 of encoding a roll sample group, for example by encoding a roll sample group into a media file 100. At step 201, the encoder encodes pictures into layers in a media file, such as media file 100.

At step 203, the encoder determines a roll sample group specifying access points into the layers. As noted above, the roll sample group is designed to be used in conjunction with GDR pictures. However, various layers may include other types of access points in addition to GDR pictures, such as a mixed NAL unit picture with both an IRAP subpicture and a non-IRAP subpicture. The encoder encodes the roll sample group into the media file.

At step 205, the encoder encodes a grouping type parameter into the media file, for example into the roll sample group. The grouping type parameter specifies a correspondence between the access points, which are samples of the roll sample group, and relevant layers of the layers. As noted above, a relevant layer is any layer referenced by an access point. The grouping type parameter includes a layer identifier method identification code parameter that specifies the nature of the access points. For example, the layer identifier method identification code parameter can be set to indicate that the access points include one or more of (1) one or GDR pictures; and (2) one or more mixed NAL unit pictures with both an IRAP subpicture and a non-IRAP subpicture. For example, the layer identifier method identification code parameter can be set to a first value to indicate the access points are all GDR pictures and a second value to indicate the access points are a combination of GDR pictures and mixed NAL unit pictures (or only mixed NAL unit pictures).

In an example, the grouping type parameter includes a target layers parameter. The target layers parameter includes a plurality of bits with each bit specifying one of the relevant layers. In an example, the layer identifier method identification code parameter can be set to specify the access points apply to only the relevant layers. In another example, the layer identifier method identification code parameter can be set to specify the access points apply to all of the layers. It should be noted that the target layers parameter may be omitted in such a case in some examples. In some examples, the grouping type parameter is denoted as group_type_parameter, the target layer parameter is denoted as target_layers, and the layer identifier method identification code parameter is denoted as layer_id_method_idc.

In an example, the layer_id_method_idc is set to zero when specifying all access points in the relevant layers are GDR pictures and the access points apply to all the layers. In another example, the layer_id_method_idc is set to one when specifying all access points in the relevant layers are GDR pictures and the access points apply to only the relevant layers. In yet another example, the layer_id_method_idc is set to two when specifying the access points in the relevant layers are GDR pictures, mixed NAL unit pictures, or combinations thereof and the access points apply to all the layers. In a further example, the layer_id_method_idc is set to three when specifying the access points in the relevant layers are GDR pictures, mixed NAL unit pictures, or combinations thereof and the access points apply to only the relevant layers.

At step 207, the encoder stores the media file. In an embodiment, the media file is transmitted toward a decoder.

Figure 3:
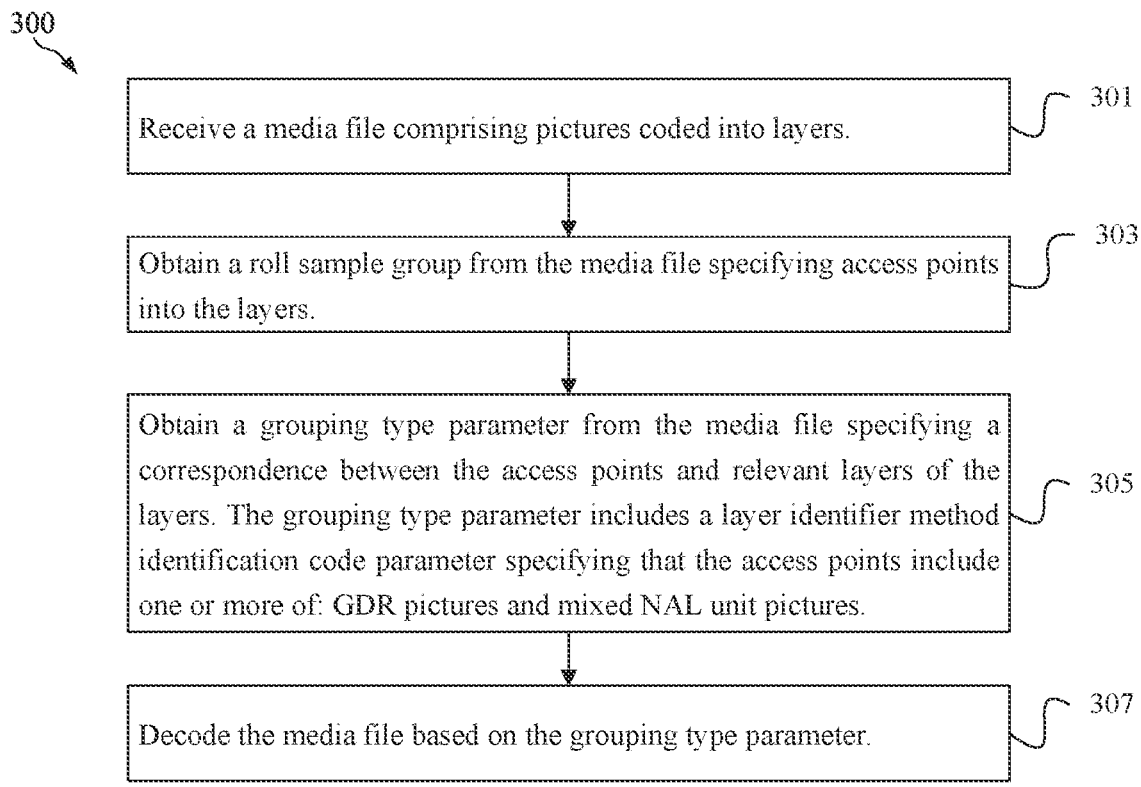
FIG. 3 is a flowchart of an example method of decoding a roll sample group.

FIG. 3 is a flowchart of an example method 300 of decoding a roll sample group, for example by employing a media file 100 received as a result of method 200. At step 301, the decoder receives a media file comprising pictures coded into layers. The media file further comprises a roll sample group.

At step 303, the decoder obtains the roll sample group from the media file. The roll sample group specifies access points into the layers.

At step 305, the decoder obtains a grouping type parameter from the media file, for example from the roll sample group. The grouping type parameter specifies a correspondence between the access points, which are samples of the roll sample group, and relevant layers of the layers. As noted above, a relevant layer is any layer that is referenced by an access point. The grouping type parameter includes a layer identifier method identification code parameter that specifies the nature of the access points. For example, the layer identifier method identification code parameter can be set to indicate that the access points include one or more of (1) one or more GDR pictures; and (2) one or more mixed NAL unit pictures with both an IRAP subpicture and a non-IRAP subpicture. For example, the layer identifier method identification code parameter can be set to a first value to indicate the access points are all GDR pictures and a second value to indicate the access points are a combination of GDR pictures and mixed NAL unit pictures (or only mixed NAL unit pictures).

In an example, the grouping type parameter includes a target layers parameter. The target layers parameter includes a plurality of bits with each bit specifying one of the relevant layers. In an example, the layer identifier method identification code parameter can be set to specify the access points apply to only the relevant layers. In another example, the layer identifier method identification code parameter can be set to specify the access points apply to all of the layers. It should be noted that the target layers parameter may be omitted in such a case in some examples. In some examples, the grouping type parameter is denoted as group_type_parameter, the target layer parameter is denoted as target_layers, and the layer identifier method identification code parameter is denoted as layer_id_method_idc.

In an example, the layer_id_method_idc is set to zero when specifying all access points in the relevant layers are GDR pictures and the access points apply to all the layers. In another example, the layer_id_method_idc is set to one when specifying all access points in the relevant layers are GDR pictures and the access points apply to only the relevant layers. In yet another example, the layer_id_method_idc is set to two when specifying the access points in the relevant layers are GDR pictures, mixed NAL unit pictures, or combinations thereof and the access points apply to all the layers. In a further example, the layer_id_method_idc is set to three when specifying the access points in the relevant layers are GDR pictures, mixed NAL unit pictures, or combinations thereof and the access points apply to only the relevant layers.

At step 307, the decoder decodes the media file based on the grouping type parameter. The decoder can then forward the decoded media file, or portions thereof (e.g., particular layers and/or sublayers), toward a display for viewing by a user.

Figure 4:
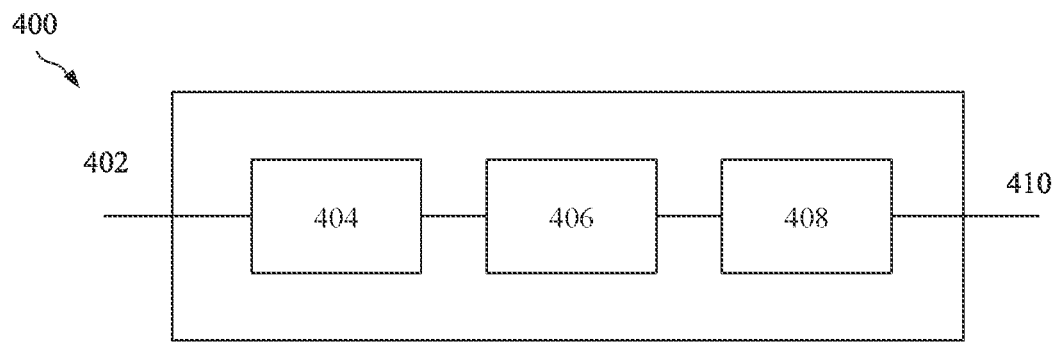
FIG. 4 is a block diagram showing an example video processing system.

FIG. 4 is a block diagram showing an example video processing system 400 in which various techniques disclosed herein may be implemented. Various implementations may include some or all of the components of the system 400. The system 400 may include input 402 for receiving video content. The video content may be received in a raw or uncompressed format, e.g., 8 or 10 bit multi-component pixel values, or may be in a compressed or encoded format. The input 402 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 400 may include a coding component 404 that may implement the various coding or encoding methods described in the present disclosure. The coding component 404 may reduce the average bitrate of video from the input 402 to the output of the coding component 404 to produce a coded representation of the video. The coding techniques are therefore sometimes called video compression or video transcoding techniques. The output of the coding component 404 may be either stored, or transmitted via a communication connected, as represented by the component 406. The stored or communicated bitstream (or coded) representation of the video received at the input 402 may be used by the component 408 for generating pixel values or displayable video that is sent to a display interface 410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 5:
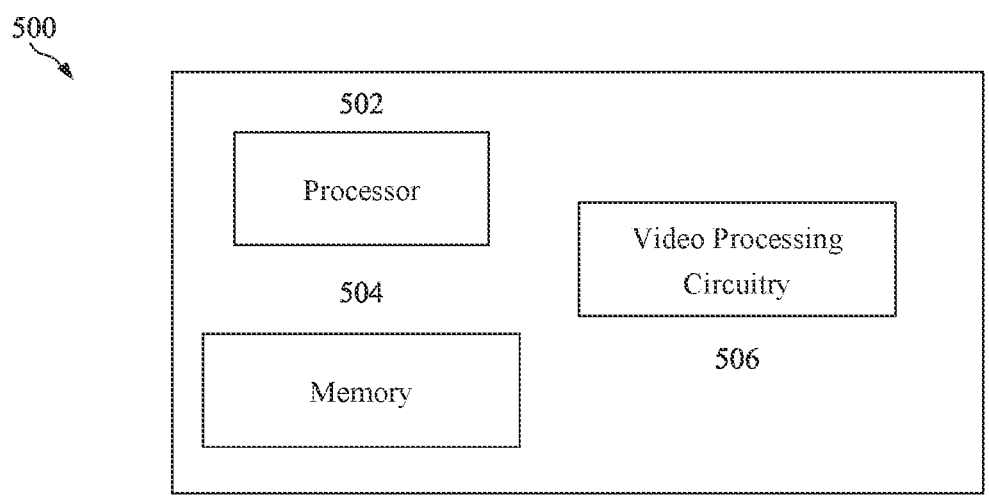
FIG. 5 is a block diagram of an example video processing apparatus.

FIG. 5 is a block diagram of an example video processing apparatus 500. The apparatus 500 may be used to implement one or more of the methods described herein. The apparatus 500 may be embodied in a smartphone, tablet, computer, Internet of Things (IoT) receiver, and so on. The apparatus 500 may include one or more processors 502, one or more memories 504 and video processing hardware 506. The processor(s) 502 may be configured to implement one or more methods described in the present disclosure. The memory (memories) 504 may be used for storing data and code used for implementing the methods and techniques described herein. The video processing hardware 506 may be used to implement, in hardware circuitry, some techniques described in the present disclosure. In some embodiments, the video processing hardware 506 may be at least partly included in the processor 502, e.g., a graphics co-processor.

Figure 6:
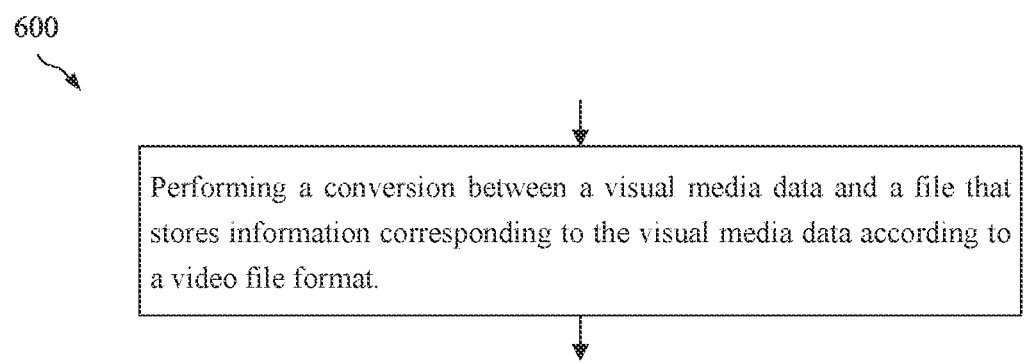
FIG. 6 is a flowchart for an example method of video processing.

FIG. 6 is a flowchart for an example method 600 of video processing. The method 600 includes performing a conversion between a visual media data and a file that stores information corresponding to the visual media data according to a video file format. In the context of an encoder, this conversion can be performed by encoding visual media data into a visual media data file in the video file format. In the context of a decoder, this conversion can be performed by decoding a visual media data file in the video file format to obtain visual media data for display.

Figure 7:
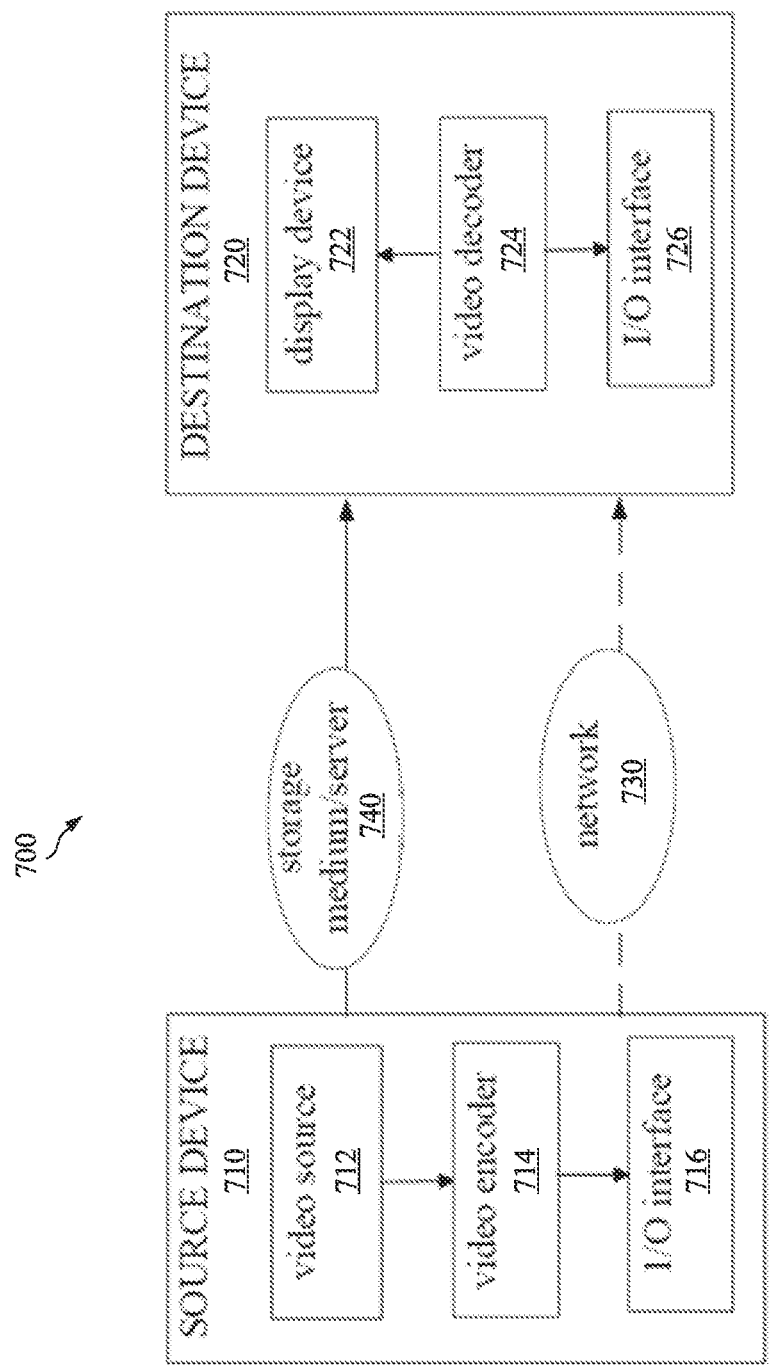
FIG. 7 is a block diagram that illustrates an example video coding system.

FIG. 7 is a block diagram that illustrates an example video coding system 700 that may utilize the techniques of this disclosure. As shown in FIG. 7, video coding system 700 may include a source device 710 and a destination device 720. Source device 710 generates encoded video data which may be referred to as a video encoding device. Destination device 720 may decode the encoded video data generated by source device 710 which may be referred to as a video decoding device.

Source device 710 may include a video source 712, a video encoder 714, and an input/output (I/O) interface 716. Video source 712 may include a source such as a video capture device, an interface to receive video data from a video content provider, and/or a computer graphics system for generating video data, or a combination of such sources. The video data may comprise one or more pictures. Video encoder 714 encodes the video data from video source 712 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 716 may include a modulator/demodulator (modem) and/or a transmitter. The encoded video data may be transmitted directly to destination device 720 via I/O interface 716 through network 730. The encoded video data may also be stored onto a storage medium/server 740 for access by destination device 720.

Destination device 720 may include an I/O interface 726, a video decoder 724, and a display device 722. I/O interface 726 may include a receiver and/or a modem. I/O interface 726 may acquire encoded video data from the source device 710 or the storage medium/server 740. Video decoder 724 may decode the encoded video data. Display device 722 may display the decoded video data to a user. Display device 722 may be integrated with the destination device 720, or may be external to destination device 720, which can be configured to interface with an external display device.

Video encoder 714 and video decoder 724 may operate according to a video compression standard, such as the High Efficiency Video Coding (HEVC) standard, Versatile Video Coding (VVC) standard and other current and/or further standards.

Figure 8:
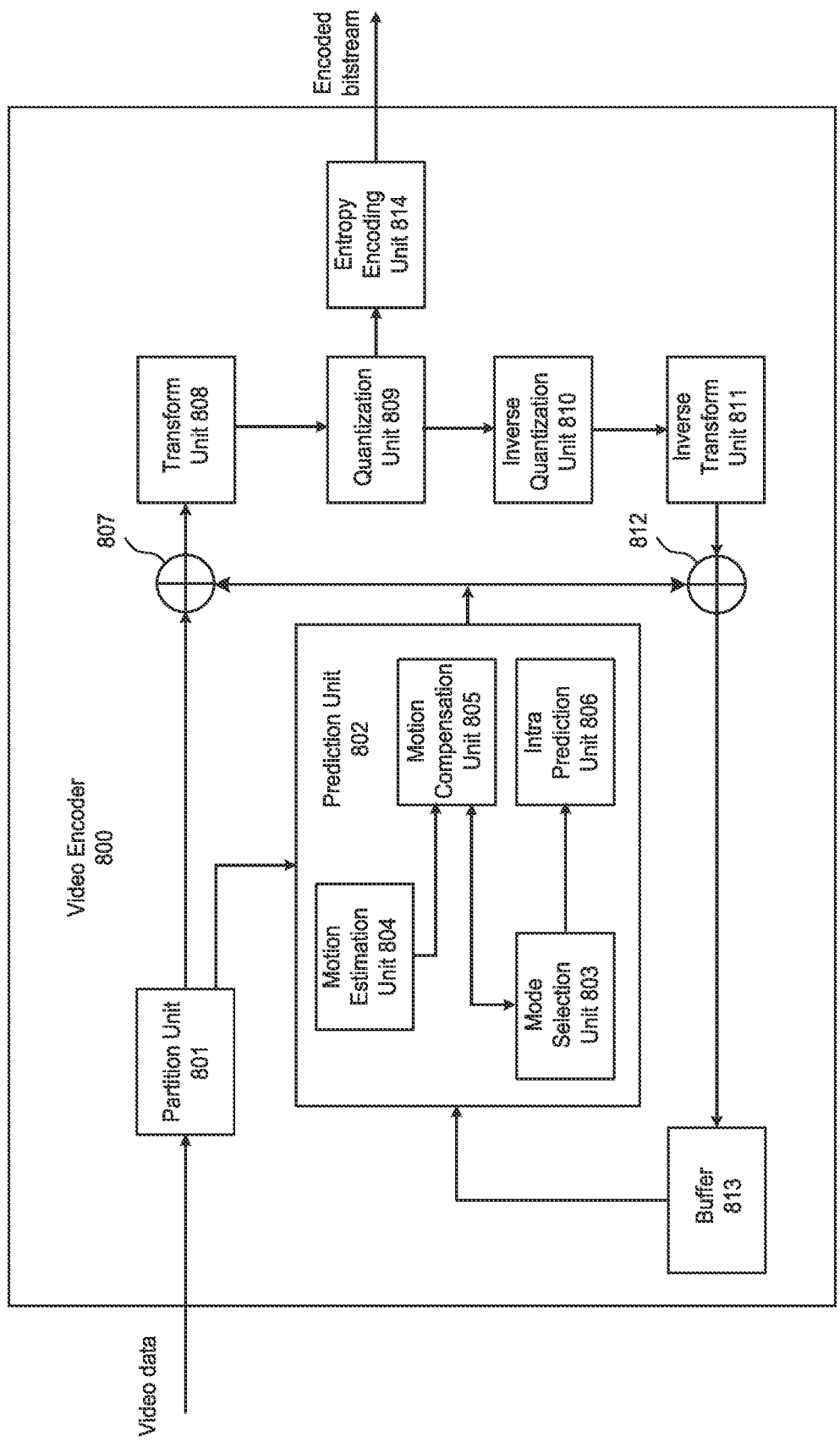
FIG. 8 is a block diagram that illustrates an example encoder.

FIG. 8 is a block diagram illustrating an example of video encoder 800, which may be video encoder 714 in the system 700 illustrated in FIG. 7. Video encoder 800 may be configured to perform any or all of the techniques of this disclosure. In the example of FIG. 8, video encoder 800 includes a plurality of functional components. The techniques described in this disclosure may be shared among the various components of video encoder 800. In some examples, a processor may be configured to perform any or all of the techniques described in this disclosure.

The functional components of video encoder 800 may include a partition unit 801, a prediction unit 802 which may include a mode select unit 803, a motion estimation unit 804, a motion compensation unit 805, an intra prediction unit 806, a residual generation unit 807, a transform processing unit 808, a quantization unit 809, an inverse quantization unit 810, an inverse transform unit 811, a reconstruction unit 812, a buffer 813, and an entropy encoding unit 814.

In other examples, video encoder 800 may include more, fewer, or different functional components. In an example, prediction unit 802 may include an intra block copy (IBC) unit. The IBC unit may perform prediction in an IBC mode in which at least one reference picture is a picture where the current video block is located.

Furthermore, some components, such as motion estimation unit 804 and motion compensation unit 805 may be highly integrated, but are represented in the example of FIG. 8 separately for purposes of explanation.

Partition unit 801 may partition a picture into one or more video blocks. Video encoder 800 and video decoder 900 may support various video block sizes.

Mode select unit 803 may select one of the coding modes, intra or inter, e.g., based on error results, and provide the resulting intra- or inter-coded block to a residual generation unit 807 to generate residual block data and to a reconstruction unit 812 to reconstruct the encoded block for use as a reference picture. In some examples, mode select unit 803 may select a combination of intra and inter prediction (CIIP) mode in which the prediction is based on an inter prediction signal and an intra prediction signal. Mode select unit 803 may also select a resolution for a motion vector (e.g., a sub-pixel or integer pixel precision) for the block in the case of inter-prediction.

To perform inter prediction on a current video block, motion estimation unit 804 may generate motion information for the current video block by comparing one or more reference frames from buffer 813 to the current video block. Motion compensation unit 805 may determine a predicted video block for the current video block based on the motion information and decoded samples of pictures from buffer 813 other than the picture associated with the current video block.

Motion estimation unit 804 and motion compensation unit 805 may perform different operations for a current video block, for example, depending on whether the current video block is in an I slice, a P slice, or a B slice.

In some examples, motion estimation unit 804 may perform uni-directional prediction for the current video block, and motion estimation unit 804 may search reference pictures of list 0 or list 1 for a reference video block for the current video block. Motion estimation unit 804 may then generate a reference index that indicates the reference picture in list 0 or list 1 that contains the reference video block and a motion vector that indicates a spatial displacement between the current video block and the reference video block. Motion estimation unit 804 may output the reference index, a prediction direction indicator, and the motion vector as the motion information of the current video block. Motion compensation unit 805 may generate the predicted video block of the current block based on the reference video block indicated by the motion information of the current video block.

In other examples, motion estimation unit 804 may perform bi-directional prediction for the current video block, motion estimation unit 804 may search the reference pictures in list 0 for a reference video block for the current video block and may also search the reference pictures in list 1 for another reference video block for the current video block. Motion estimation unit 804 may then generate reference indexes that indicate the reference pictures in list 0 and list 1 containing the reference video blocks and motion vectors that indicate spatial displacements between the reference video blocks and the current video block. Motion estimation unit 804 may output the reference indexes and the motion vectors of the current video block as the motion information of the current video block. Motion compensation unit 805 may generate the predicted video block of the current video block based on the reference video blocks indicated by the motion information of the current video block.

In some examples, motion estimation unit 804 may output a full set of motion information for decoding processing of a decoder. In some examples, motion estimation unit 804 may not output a full set of motion information for the current video. Rather, motion estimation unit 804 may signal the motion information of the current video block with reference to the motion information of another video block. For example, motion estimation unit 804 may determine that the motion information of the current video block is sufficiently similar to the motion information of a neighboring video block.

In one example, motion estimation unit 804 may indicate, in a syntax structure associated with the current video block, a value that indicates to the video decoder 900 that the current video block has the same motion information as another video block.

In another example, motion estimation unit 804 may identify, in a syntax structure associated with the current video block, another video block and a motion vector difference (MVD). The motion vector difference indicates a difference between the motion vector of the current video block and the motion vector of the indicated video block. The video decoder 900 may use the motion vector of the indicated video block and the motion vector difference to determine the motion vector of the current video block.

As discussed above, video encoder 800 may predictively signal the motion vector. Two examples of predictive signaling techniques that may be implemented by video encoder 800 include advanced motion vector prediction (AMVP) and merge mode signaling.

Intra prediction unit 806 may perform intra prediction on the current video block. When intra prediction unit 806 performs intra prediction on the current video block, intra prediction unit 806 may generate prediction data for the current video block based on decoded samples of other video blocks in the same picture. The prediction data for the current video block may include a predicted video block and various syntax elements.

Residual generation unit 807 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 807 may not perform the subtracting operation.

Transform processing unit 808 may generate one or more transform coefficient video blocks for the current video block by applying one or more transforms to a residual video block associated with the current video block.

After transform processing unit 808 generates a transform coefficient video block associated with the current video block, quantization unit 809 may quantize the transform coefficient video block associated with the current video block based on one or more quantization parameter (QP) values associated with the current video block.

Inverse quantization unit 810 and inverse transform unit 811 may apply inverse quantization and inverse transforms to the transform coefficient video block, respectively, to reconstruct a residual video block from the transform coefficient video block. Reconstruction unit 812 may add the reconstructed residual video block to corresponding samples from one or more predicted video blocks generated by the prediction unit 802 to produce a reconstructed video block associated with the current block for storage in the buffer 813.

After reconstruction unit 812 reconstructs the video block, the loop filtering operation may be performed to reduce video blocking artifacts in the video block.

Entropy encoding unit 814 may receive data from other functional components of the video encoder 800. When entropy encoding unit 814 receives the data, entropy encoding unit 814 may perform one or more entropy encoding operations to generate entropy encoded data and output a bitstream that includes the entropy encoded data.

Figure 9:
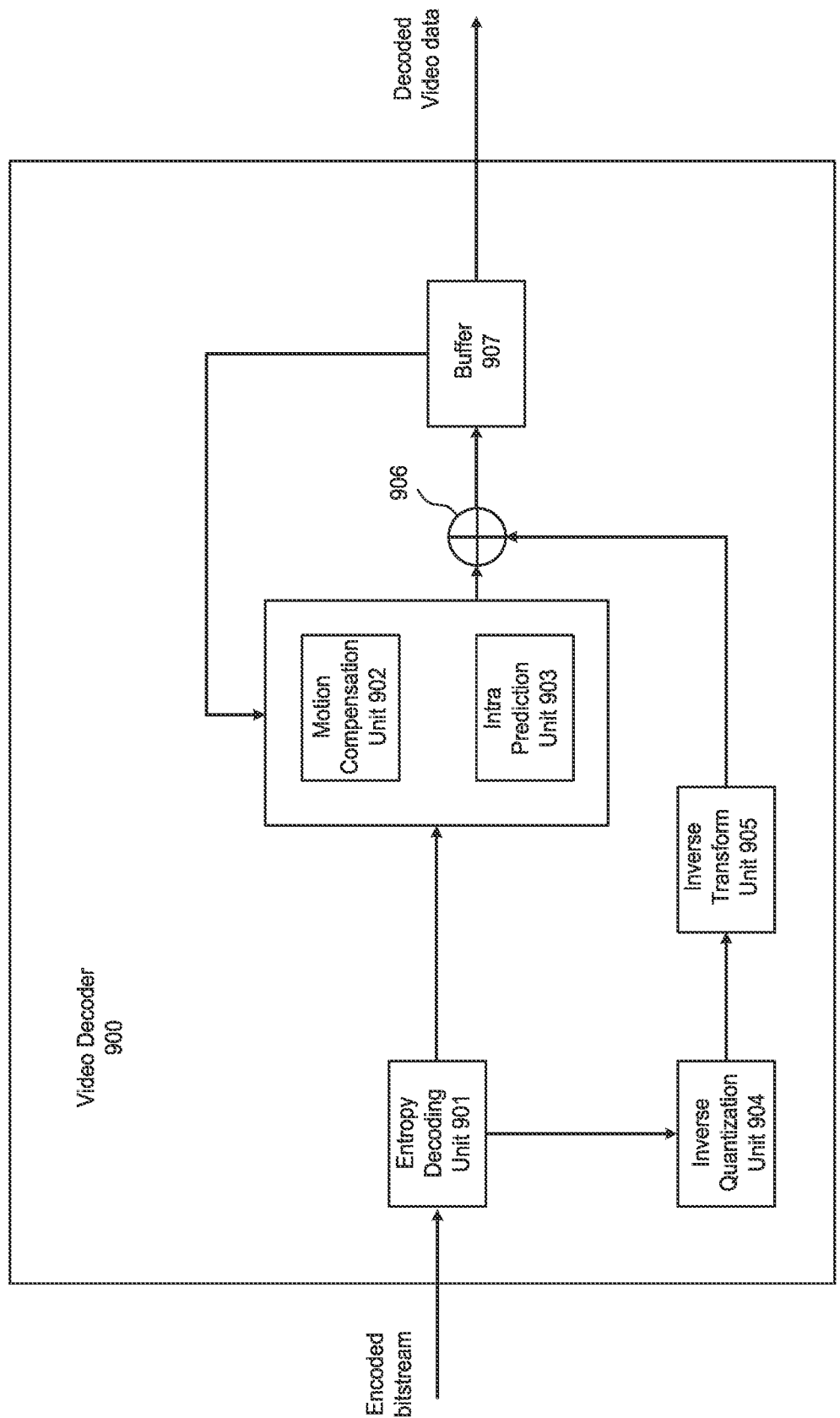
FIG. 9 is a block diagram that illustrates an example decoder.

FIG. 9 is a block diagram illustrating an example of video decoder 900 which may be video decoder 724 in the system 700 illustrated in FIG. 7.

The video decoder 900 may be configured to perform any or all of the techniques of this disclosure. In the example of FIG. 9, the video decoder 900 includes a plurality of functional components. The techniques described in this disclosure may be shared among the various components of the video decoder 900. In some examples, a processor may be configured to perform any or all of the techniques described in this disclosure.

In the example of FIG. 9, video decoder 900 includes an entropy decoding unit 901, a motion compensation unit 902, an intra prediction unit 903, an inverse quantization unit 904, an inverse transformation unit 905, and a reconstruction unit 906 and a buffer 907. Video decoder 900 may, in some examples, perform a decoding pass generally reciprocal to the encoding pass described with respect to video encoder 800 (FIG. 8).

Entropy decoding unit 901 may retrieve an encoded bitstream. The encoded bitstream may include entropy coded video data (e.g., encoded blocks of video data). Entropy decoding unit 901 may decode the entropy coded video data, and from the entropy decoded video data, motion compensation unit 902 may determine motion information including motion vectors, motion vector precision, reference picture list indexes, and other motion information. Motion compensation unit 902 may, for example, determine such information by performing the AMVP and merge mode.

Motion compensation unit 902 may produce motion compensated blocks, possibly performing interpolation based on interpolation filters. Identifiers for interpolation filters to be used with sub-pixel precision may be included in the syntax elements.

Motion compensation unit 902 may use interpolation filters as used by video encoder 800 during encoding of the video block to calculate interpolated values for sub-integer pixels of a reference block. Motion compensation unit 902 may determine the interpolation filters used by video encoder 800 according to received syntax information and use the interpolation filters to produce predictive blocks.

Motion compensation unit 902 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 903 may use intra prediction modes for example received in the bitstream to form a prediction block from spatially adjacent blocks. Inverse quantization unit 904 inverse quantizes, i.e., de-quantizes, the quantized video block coefficients provided in the bitstream and decoded by entropy decoding unit 901. Inverse transform unit 905 applies an inverse transform.

Reconstruction unit 906 may sum the residual blocks with the corresponding prediction blocks generated by motion compensation unit 902 or intra-prediction unit 903 to form decoded blocks. If desired, a deblocking filter may also be applied to filter the decoded blocks in order to remove blockiness artifacts. The decoded video blocks are then stored in buffer 907, which provides reference blocks for subsequent motion compensation/intra prediction and also produces decoded video for presentation on a display device.

Figure 10:
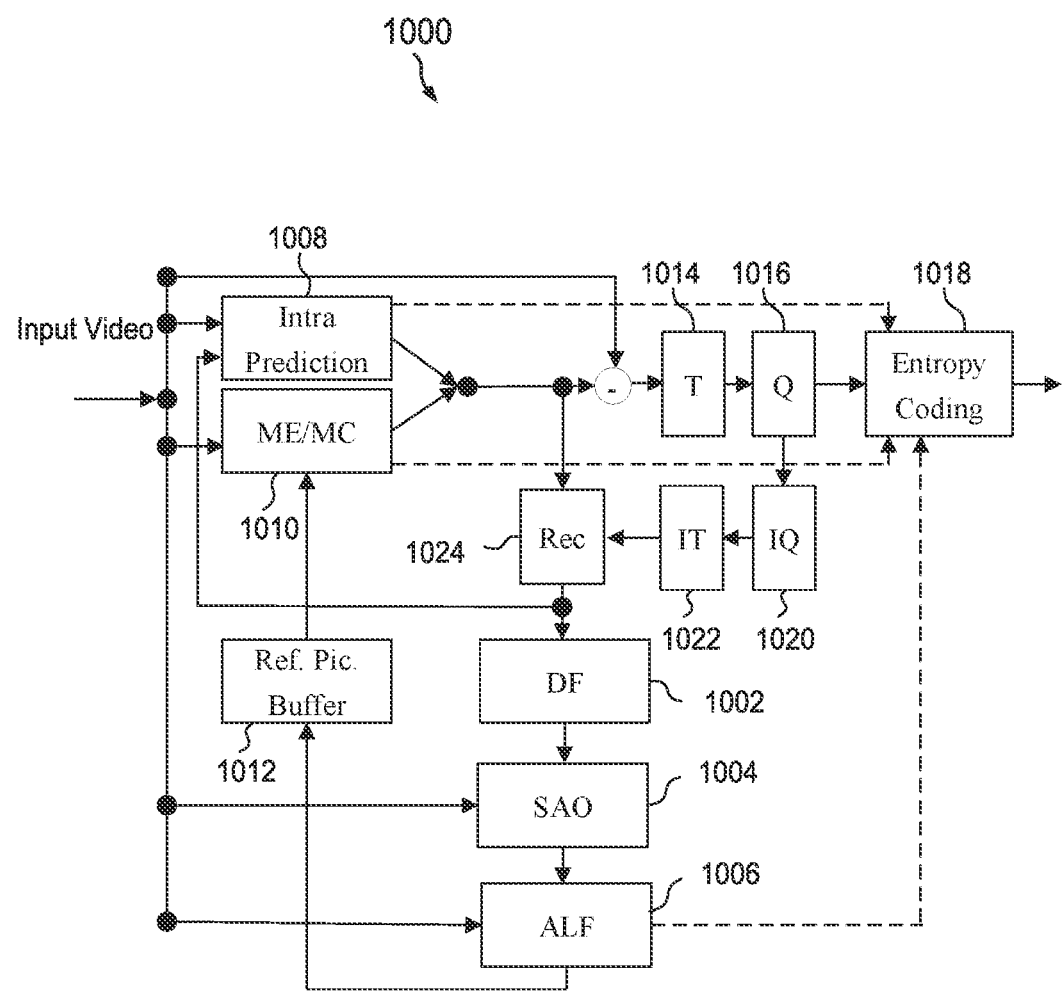
FIG. 10 is a schematic diagram of an example encoder.

FIG. 10 is a schematic diagram of an example encoder 1000. The encoder 1000 is suitable for implementing the techniques of VVC. The encoder 1000 includes three in-loop filters, namely a deblocking filter (DF) 1002, a sample adaptive offset (SAO) 1004, and an adaptive loop filter (ALF) 1006. Unlike the DF 1002, which uses predefined filters, the SAO 1004 and the ALF 1006 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1006 is located at the last processing stage of each picture and can be regarded as a tool trying to catch and fix artifacts created by the previous stages.

The encoder 1000 further includes an intra prediction component 1008 and a motion estimation/compensation (ME/MC) component 1010 configured to receive input video. The intra prediction component 1008 is configured to perform intra prediction, while the ME/MC component 1010 is configured to utilize reference pictures obtained from a reference picture buffer 1012 to perform inter prediction. Residual blocks from inter prediction or intra prediction are fed into a transform component 1014 and a quantization component 1016 to generate quantized residual transform coefficients, which are fed into an entropy coding component 1018. The entropy coding component 1018 entropy codes the prediction results and the quantized transform coefficients and transmits the same toward a video decoder (not shown). Quantization components output from the quantization component 1016 may be fed into an inverse quantization components 1020, an inverse transform component 1022, and a reconstruction (REC) component 1024. The REC component 1024 is able to output images to the DF 1002, the SAO 1004, and the ALF 1006 for filtering prior to those images being stored in the reference picture buffer 1012.

A listing of solutions preferred by some examples is provided next.

The following solutions show examples of techniques discussed herein.

1. A visual media processing method (e.g., method 600 shown in FIG. 6), comprising: performing (602) a conversion between a visual media data and a file that stores information corresponding to the visual media data according to a video file format; wherein the video file format includes a decoder configuration record that is configured with information for content selection, wherein the decoder configuration record includes one or more of fields: a required decoded picture buffer size, a maximum picture output reordering, a maximum latency, a gradual decoding refresh pictures enabled flag, a clean random access pictures enabled flag, reference picture resampling enabled flag, spatial resolution change with coded video layer sequence enabled flag, a subpicture partitioning enabled flag, a maximum number of subpictures in each picture, a wavefront parallel processing enabled flag, a tile partitioning enabled flag, a maximum number of tiles per picture, a slice partitioning enabled flag, a rectangular slices enabled flag, a raster-scan slices enabled flag, a maximum number of slices per picture.

2. A visual media processing method, comprising: performing a conversion between a visual media data and a file that stores information corresponding to the visual media data according to a video file format according to a rule; wherein the rule specifies that a field indicative of a number of temporal layers is includes in a decoder configuration record depending on whether a profile-level-tier information of the visual media data is included in the file; wherein rule further specifies that the field is included before the profile-level-tier information.

3. The method of solution 2, wherein the rule further specifies an order in which the profile-level-tier information occurs in the video file format with respect to one or more additional information fields.

4. The method of solution 3, wherein the one or more additional information fields include a chroma format indication field, a bit depth field, a field indicating number of temporal layers, or a field indicating whether a constant frame rate is used for the visual media data.

5. The method of solution 3, wherein the one or more additional information fields include a reserved bit field.

6. The method of any of solutions 2-5, wherein the rule specifies that the profile-tier-level information is included as a last field of the decoder configuration record.

7. The method of any of solutions 1-6, wherein the conversion comprises generating a bitstream representation of the visual media data and storing the bitstream representation to the file according to the format rule.

8. The method of any of solutions 1-6, wherein the conversion comprises parsing the file according to the format rule to recover the visual media data.

9. A video decoding apparatus comprising a processor configured to implement a method recited in one or more of solutions 1 to 8.

10. A video encoding apparatus comprising a processor configured to implement a method recited in one or more of solutions 1 to 8.

11. A computer program product having computer code stored thereon, the code, when executed by a processor, causes the processor to implement a method recited in any of solutions 1 to 8.

12. A computer readable medium on which a bitstream representation complying to a file format that is generated according to any of solutions 1 to 8.

13. A method, apparatus or system described in the present disclosure. In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing visual media data comprising:
performing a conversion between visual media data and a visual media data file that includes pictures in layers, based on a random access recovery point (roll) sample group specifying access points into the layers, and a grouping type parameter, the grouping type parameter specifying a correspondence between the access points and relevant layers of the layers and including a layer identifier method identification code parameter specifying that the access points include one or more of:
one or more gradual decoding refresh (GDR) pictures; and
one or more mixed network abstraction layer (NAL) unit pictures with both an intra random access point (IRAP) subpicture and a non-IRAP subpicture,
wherein the layer identifier method identification code parameter is denoted as layer_id_method_idc, and wherein the layer_id_method_idc equal to one or three specifies that: the access points apply to only the relevant layers and each bit in a target layer parameter included in the grouping type parameter specifies one of the relevant layers.

2. The method of claim 1, wherein the conversion includes:
encoding the pictures into the layers in the visual media data file;
determining the roll sample group specifying access points into the layers;
encoding the grouping type parameter into the visual media data file; and
storing the visual media data file.

3. The method of claim 1, wherein the conversion includes:
receiving the visual media data file comprising the pictures coded into the layers;
obtaining the roll sample group from the visual media data file, the roll sample group specifying the access points into the layers;
obtaining the grouping type parameter from the visual media data file; and
decoding the visual media data file based on the grouping type parameter.

4. The method of claim 1, wherein a value of the layer identifier method identification code parameter specifies that the access points apply to only the relevant layers or the access points apply to all of the layers.

5. The method of claim 1, wherein the grouping type parameter is denoted as group_type_parameter, and wherein the target layer parameter is denoted as target_layers.

6. The method of claim 1, wherein the layer_id_method_idc is set to zero when specifying all access points in the relevant layers are GDR pictures and the access points apply to all the layers.

7. The method of claim 1, wherein the layer_id_method_idc is set to one when specifying all access points in the relevant layers are GDR pictures and the access points apply to only the relevant layers.

8. The method of claim 1, wherein the layer_id_method_idc is set to two when specifying the access points in the relevant layers are GDR pictures, mixed NAL unit pictures, or combinations thereof and the access points apply to all the layers.

9. The method of claim 1, wherein the layer_id_method_idc is set to three when specifying the access points in the relevant layers are GDR pictures, mixed NAL unit pictures, or combinations thereof and the access points apply to only the relevant layers.

10. An apparatus for processing video data comprising a processor and a non-transitory memory with instructions thereon, wherein the instructions upon execution by the processor, cause the processor to:
perform a conversion between visual media data and a visual media data file that includes pictures in layers, based on a random access recovery point (roll) sample group specifying access points into the layers, and a grouping type parameter, the grouping type parameter specifying a correspondence between the access points and relevant layers of the layers and including a layer identifier method identification code parameter specifying that the access points include one or more of:
one or more gradual decoding refresh (GDR) pictures; and
one or more mixed network abstraction layer (NAL) unit pictures with both an intra random access point (IRAP) subpicture and a non-IRAP subpicture,
wherein the layer identifier method identification code parameter is denoted as layer_id_method_idc, and wherein the layer_id_method_idc equal to one or three specifies that: the access points apply to only the relevant layers and each bit in a target layer parameter included in the grouping type parameter specifies one of the relevant layers.

11. The apparatus of claim 10, wherein the conversion includes:
encoding the pictures into the layers in the visual media data file;
determining the roll sample group specifying access points into the layers;
encoding the grouping type parameter into the visual media data file; and
storing the visual media data file.

12. The apparatus of claim 10, wherein the conversion includes:
receiving the visual media data file comprising the pictures coded into the layers;
obtaining the roll sample group from the visual media data file, the roll sample group specifying the access points into the layers;
obtaining the grouping type parameter from the visual media data file; and
decoding the visual media data file based on the grouping type parameter.

13. The apparatus of claim 10, wherein a value of the layer identifier method identification code parameter specifies that the access points apply to only the relevant layers or the access points apply to all of the layers.

14. The apparatus of claim 10, wherein the grouping type parameter is denoted as group_type_parameter, wherein the target layer parameter is denoted as target_layers,
wherein the layer_id_method_idc is set to zero when specifying all access points in the relevant layers are GDR pictures and the access points apply to all the layers,
wherein the layer_id_method_idc is set to one when specifying all access points in the relevant layers are GDR pictures and the access points apply to only the relevant layers,
wherein the layer_id_method_idc is set to two when specifying the access points in the relevant layers are GDR pictures, mixed NAL unit pictures, or combinations thereof and the access points apply to all the layers, and
wherein the layer_id_method_idc is set to three when specifying the access points in the relevant layers are GDR pictures, mixed NAL unit pictures, or combinations thereof and the access points apply to only the relevant layers.

15. A non-transitory computer readable medium comprising a computer program product for use by a video coding device, the computer program product comprising computer executable instructions stored on the non-transitory computer readable medium such that when executed by a processor cause the video coding device to:

perform a conversion between visual media data and a visual media data file that includes pictures in layers, based on a random access recovery point (roll) sample group specifying access points into the layers, and a grouping type parameter, the grouping type parameter specifying a correspondence between the access points and relevant layers of the layers and including a layer identifier method identification code parameter specifying that the access points include one or more of:

one or more gradual decoding refresh (GDR) pictures; and one or more mixed network abstraction layer (NAL) unit pictures with both an intra random access point (IRAP) subpicture and a non-IRAP subpicture, wherein the layer identifier method identification code parameter is denoted as layer_id_method_idc, and wherein the layer_id_method_idc equal to one or three specifies that: the access points apply to only the relevant layers and each bit in a target layer parameter included in the grouping type parameter specifies one of the relevant layers.

16. The non-transitory computer readable medium of claim 15, wherein a value of the layer identifier method identification code parameter specifies that the access points apply to only the relevant layers or the access points apply to all of the layers.

17. The non-transitory computer readable medium of claim 15, wherein the grouping type parameter is denoted as group_type_parameter, wherein the target layer parameter is denoted as target_layers, wherein the layer_id_method_idc is set to zero when specifying all access points in the relevant layers are GDR pictures and the access points apply to all the layers, wherein the layer_id_method_idc is set to one when specifying all access points in the relevant layers are GDR pictures and the access points apply to only the relevant layers, wherein the layer_id_method_idc is set to two when specifying the access points in the relevant layers are GDR pictures, mixed NAL unit pictures, or combinations thereof and the access points apply to all the layers, and wherein the layer_id_method_idc is set to three when specifying the access points in the relevant layers are GDR pictures, mixed NAL unit pictures, or combinations thereof and the access points apply to only the relevant layers.

\* \* \* \* \*